(12) United States Patent
Badic et al.

(10) Patent No.: US 10,455,425 B2
(45) Date of Patent: Oct. 22, 2019

(54) EVOLVED NODE-B, SHARED SPECTRUM CONTROLLER AND METHOD FOR COMMUNICATION IN SHARED SPECTRUM

(71) Applicant: Intel IP Corporation, Santa Clara, CA (US)

(72) Inventors: Biljana Badic, Munich (DE); Markus Dominik Mueck, Unterhaching (DE); Srikathyayani Srikanteswara, Portland, OR (US); Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/566,190

(22) PCT Filed: Mar. 21, 2016

(86) PCT No.: PCT/US2016/023384
§ 371 (c)(1),
(2) Date: Oct. 12, 2017

(87) PCT Pub. No.: WO2016/182634
PCT Pub. Date: Nov. 17, 2017

(65) Prior Publication Data
US 2018/0115903 A1    Apr. 26, 2018

Related U.S. Application Data

(60) Provisional application No. 62/161,762, filed on May 14, 2015.

(51) Int. Cl.
*H04W 16/14*    (2009.01)
*H04W 16/02*    (2009.01)
(Continued)

(52) U.S. Cl.
CPC ............. *H04W 16/02* (2013.01); *H04W 8/00* (2013.01); *H04W 12/02* (2013.01); *H04W 16/14* (2013.01);
(Continued)

(58) Field of Classification Search
CPC ....... H04W 16/02; H04W 8/00; H04W 12/02; H04W 16/14; H04W 24/08; H04W 24/10; H04W 72/042; H04W 88/12
See application file for complete search history.

(56) References Cited

U.S. PATENT DOCUMENTS

| 2009/0298522 A1 | 12/2009 | Chaudhri et al. |
| 2014/0080535 A1 | 3/2014 | Gauvreau et al. |

(Continued)

FOREIGN PATENT DOCUMENTS

| CN | 107852648 | 3/2018 |
| TW | 201703559 A | 1/2017 |

(Continued)

OTHER PUBLICATIONS

"International Application Serial No. PCT/US2016/023384, International Search Report dated Jun. 28, 2016", 3 pgs.

(Continued)

*Primary Examiner* — Pakee Fang
(74) *Attorney, Agent, or Firm* — Schwegman Lundberg & Woessner, P.A.

(57) ABSTRACT

Embodiments of an Evolved Node-B (eNB), shared spectrum controller and methods for communication in shared spectrum are generally described herein. A mobile network shared spectrum controller may operate as part of a domain of a mobile network. A public shared spectrum controller may operate externally to the mobile network domain. The mobile network shared spectrum controller and the public shared spectrum controller may operate cooperatively to (Continued)

perform operations of a shared spectrum controller, such as management of secondary usage of shared spectrum by a group of eNBs. The mobile network shared spectrum controller may obfuscate at least a portion of network configuration information from the public shared spectrum controller to enable maintenance of confidential information within the mobile network domain.

23 Claims, 20 Drawing Sheets

(51) Int. Cl.
*H04W 8/00* (2009.01)
*H04W 12/02* (2009.01)
*H04W 24/08* (2009.01)
*H04W 24/10* (2009.01)
*H04W 72/04* (2009.01)
*H04W 88/12* (2009.01)

(52) U.S. Cl.
CPC .......... *H04W 24/08* (2013.01); *H04W 24/10* (2013.01); *H04W 72/042* (2013.01); *H04W 88/12* (2013.01)

(56) References Cited

U.S. PATENT DOCUMENTS

| | | | |
|---|---|---|---|
| 2015/0063327 A1 | 3/2015 | Barriac et al. | |
| 2015/0373554 A1* | 12/2015 | Freda | H04W 16/14 455/450 |

FOREIGN PATENT DOCUMENTS

| | | |
|---|---|---|
| WO | WO-2012048090 A2 | 4/2012 |
| WO | WO-2014117135 A2 | 7/2014 |
| WO | 2015048756 | 4/2015 |

OTHER PUBLICATIONS

"International Application Serial No. PCT/US2016/023384, Written Opinion dated Jun. 28, 2016", 10 pgs.

"International Application Serial No. PCT/US2016/023384, International Preliminary Report on Patentability dated Nov. 23, 2017", 12 pgs.

"European Application Serial No. 167931118, Extended European Search Report dated Oct. 24, 2018", 7 pgs.

Ghosh, Soumik, "OpenPAWS: An open source PAWS and UHF TV White Space database implementation for India", 2015 Twenty First National Conference on Communications (NCC). IEEE, (Feb. 27, 2015), 1-6.

* cited by examiner

EVOLVED NODE-B, SHARED SPECTRUM CONTROLLER AND METHOD FOR COMMUNICATION IN SHARED SPECTRUM

PRIORITY CLAIM

This application is a U.S. National Stage Filing under 35 U.S.C. 371 from International Application No. PCT/US2016/023384, filed Mar. 21, 2016 and published in English as WO 2016/182634 on Nov. 17, 2016, which claims priority to U.S. Provisional Patent Application Ser. No. 62/161,762, filed May 14, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, although the scope of the embodiments is not limited in this respect. Some embodiments relate to primary and secondary usage of spectrum, such as shared spectrum. Some embodiments relate to spectrum access policies for shared spectrum. Some embodiments relate to Licensed Shared Access (LSA) controllers, repositories and systems. Some embodiments relate to Spectrum Access System (SAS) controllers and systems.

BACKGROUND

A wireless network may support communication with mobile devices for services such as voice, data and others. In some cases, throughput or capacity demands for such services may provide challenges for the network. As an example, a large number of mobile devices may be connected to the network. As another example, high data rates may be desired by some of the mobile devices connected to the network. In some cases, a limited amount of available spectrum may be available, and the network may be unable to support the mobile devices in that spectrum. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
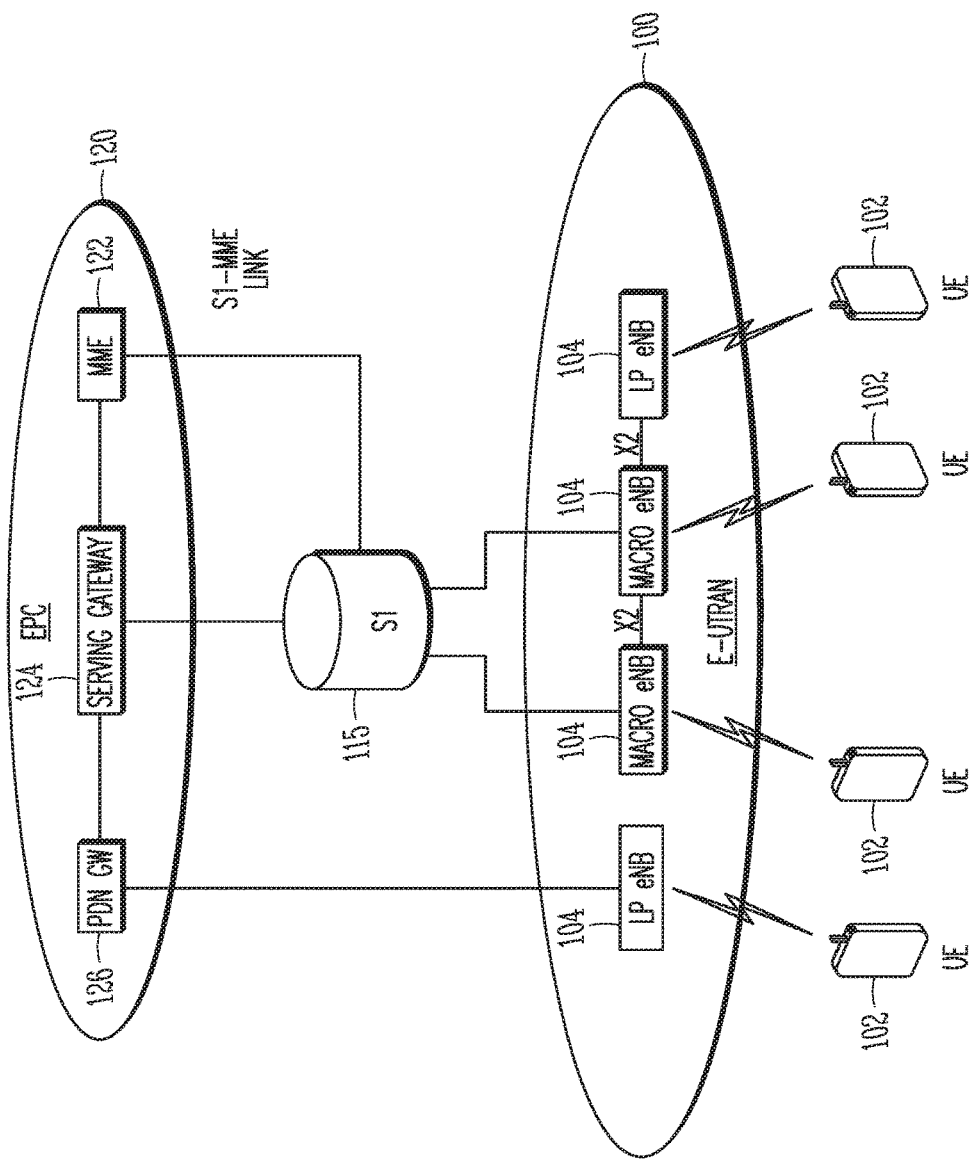
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other networks may be used in some embodiments. As an example, a Fifth Generation (5G) network may be used in some cases. Such networks may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit data messages to the UE 102 and may receive data messages from the UE 102. The data messages may be exchanged in shared spectrum, in some embodiments. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (which may be macro, micro, small-cell or any other Access Point type) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
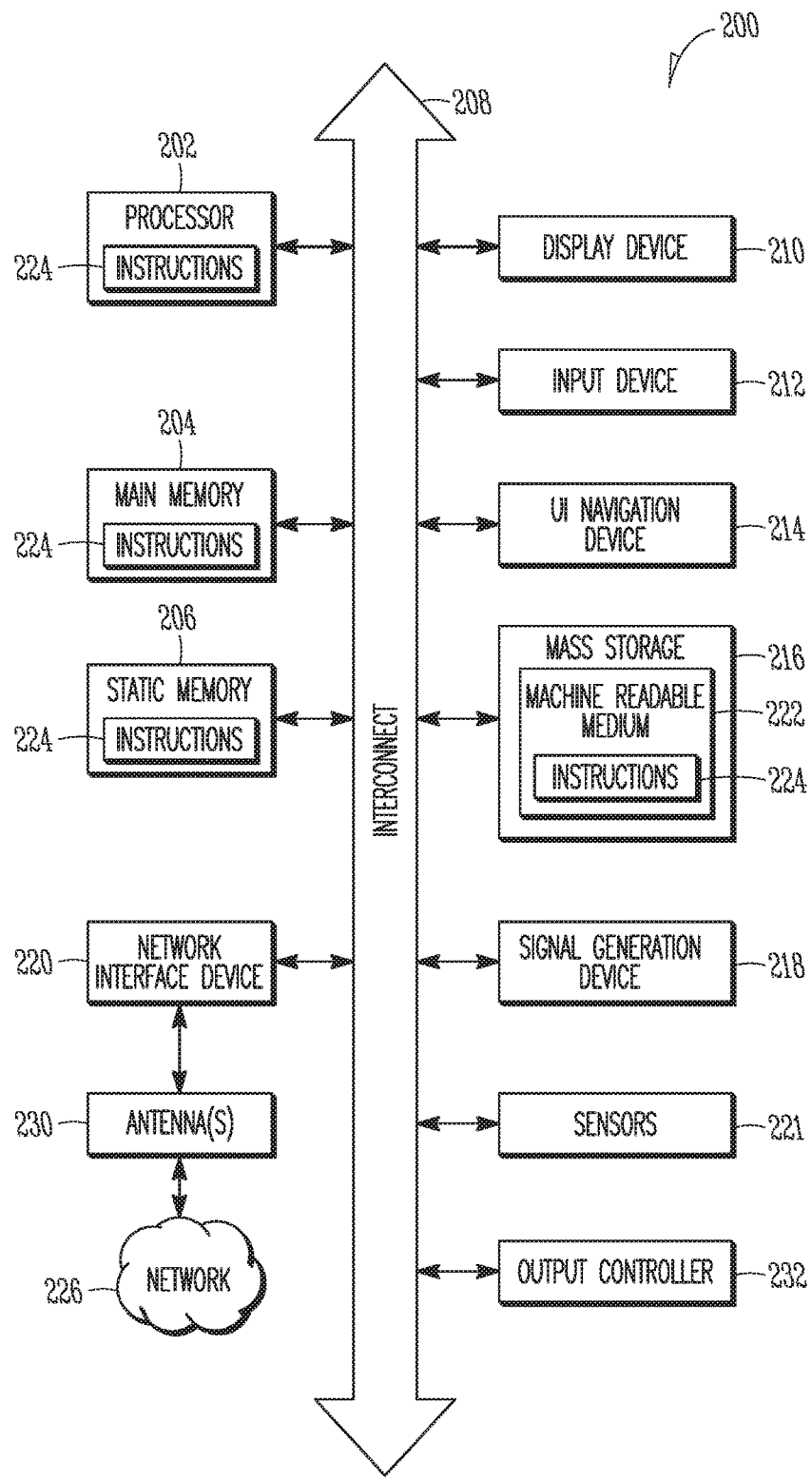
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, shared spectrum controller, shared spectrum repository, access point (AP), station (STA), mobile device, base station, personal computer (PC), a tablet PC, a set-top box (STB), a personal digital assistant (PDA), a mobile telephone, a smart phone, a web appliance, a network router, switch or bridge, a controller and/or controller device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
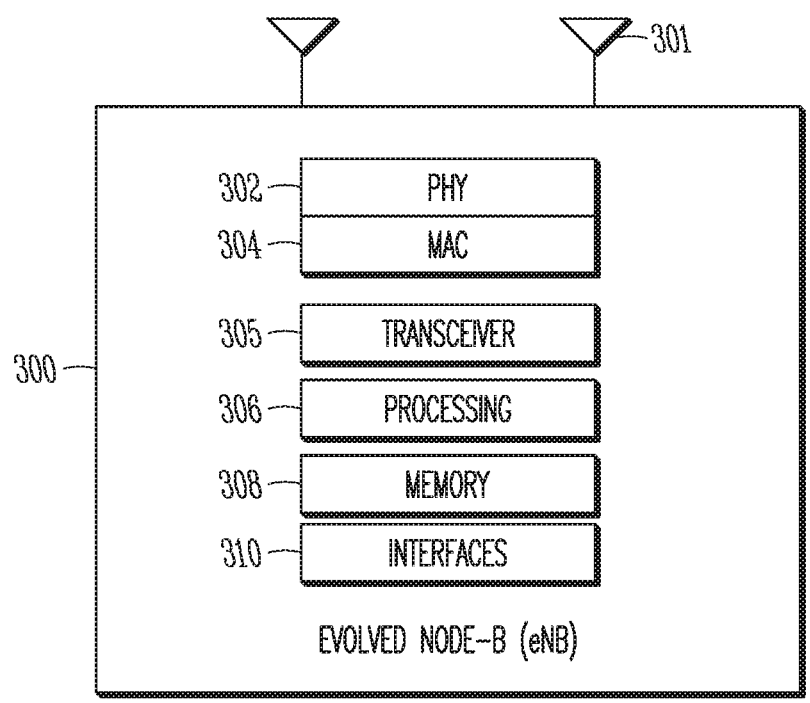
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the cNB 300 may be a stationary non-mobile device. The eNB 300 may be suitable for use as an eNB 104 as depicted in FIG. 1, in some embodiments. It should be noted that in some embodiments, the eNB 104 may be or may be configured to operate as a macro cell eNB, femto cell eNB, pico cell eNB, small cell eNB and/or other type of eNB 104.

The eNB 300 may include physical layer circuitry 302 and a transceiver 305, one or both of which may enable transmission and reception of signals to and from the UE 102, other eNBs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

The antennas 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301 may be effectively separated to take advantage of spatial diversity and the different channel characteristics that may result.

In some embodiments, the eNB 300 and/or the UE 102 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 102, eNB 300 or other device may include one or more of a keyboard, a display, a non-volatile memory port, multiple antennas, a graphics processor, an application processor, speakers, and other mobile device elements. The display may be an LCD screen including a touch screen.

Although the eNB 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors. DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the eNB 300 may include various components of the eNB 300 as shown in FIG. 3 and/or the machine 200 shown in FIG. 2. Accordingly, techniques and operations described herein that refer to the eNB 300 (or 104) may be applicable to an apparatus for an eNB.

In accordance with some embodiments, primary usage of shared spectrum by incumbent devices may be prioritized over secondary usage of the shared spectrum. A mobile network shared spectrum controller may operate as part of a domain of a mobile network. A public shared spectrum controller may operate externally to the mobile network domain. The mobile network shared spectrum controller and the public shared spectrum controller may operate cooperatively to perform operations of a shared spectrum controller, such as management of secondary usage of shared spectrum by a group of eNBs. The mobile network shared spectrum controller may obfuscate at least a portion of network configuration information from the public shared spectrum controller to enable maintenance of confidential information within the mobile network domain. These embodiments will be described in more detail below.

Figure 4:
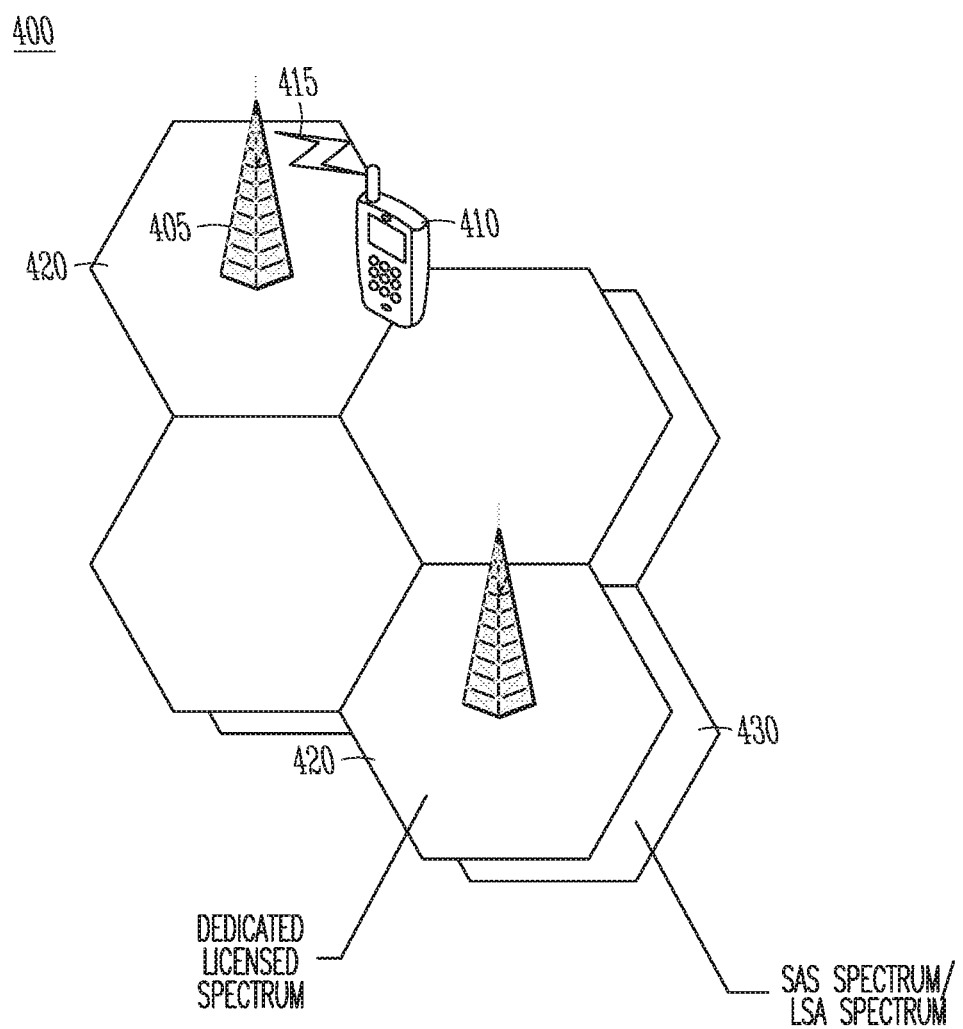
FIG. 4 illustrates an example of spectrum sharing in accordance with some embodiments.

FIG. 4 illustrates an example of spectrum sharing in accordance with some embodiments. In some embodiments, shared spectrum may be used by and/or allocated to different devices based on a usage priority. In some cases, incumbent devices and/or systems, which may be referred to as "tier-1" or other, may use the shared spectrum with a highest priority. Examples of incumbent devices and/or systems include radar, military, government and/or other devices and/or systems, although embodiments are not limited to these examples. In some cases, other devices and/or systems, which may be referred to as "tier-2" or "tier-3" or other, may use the shared spectrum in accordance with the usage priority. For instance, when incumbent devices are not using the shared spectrum, one or more base stations may use the shared spectrum for wireless communication with one or more mobile devices in compliance with applicable policies for usage of the shared spectrum. Accordingly, such tier-2 and/or tier-3 devices may include base stations, mobile devices and/or other devices in some cases.

In some embodiments, Spectrum Access System (SAS) spectrum sharing techniques may be used, although embodiments are not limited to the use of SAS for spectrum sharing. In some embodiments, Licensed Shared Access (LSA) spectrum sharing techniques may be used, although embodiments are not limited to the use of LSA for spectrum sharing. It should be noted that embodiments are not limited to the number of eNBs 405, UEs 410, cells or other elements shown in FIG. 4. Embodiments are also not limited to the arrangement shown in FIG. 4. In addition, embodiments are not limited to the usage of eNBs 405 and UEs 410 (which may be arranged to operate according to a 3GPP LTE protocol). For instance, APs, STAs, other base station components and/or other mobile devices may be used in some embodiments.

In the spectrum sharing scenario 400, the eNB 405 may communicate with a UE 410 over the wireless link 415. As shown in FIG. 4, the top layer of cells 420 may indicate communication (between the eNB 405 and the UE 410, for instance) in dedicated licensed spectrum. The bottom layer of cells 430 may indicate communication in shared spectrum, which may be LSA spectrum in this example.

In an example of spectrum sharing using LSA techniques, a 3GPP LTE network may be operated on licensed shared basis in the 2.3-2.4 GHz frequency band which corresponds to 3GPP LTE Band 40. An incumbent (tier-1) user (or base station) may be prioritized over the licensee (tier-2) user (or base station). For instance, a mobile network operator (MNO) may be required to vacate the LSA band for a given geographic area, a given frequency range and a given period of time for which the incumbent is requiring access to the resource. In some cases, the LSA band may be combined with LTE operation in dedicated licensed spectrum through suitable Carrier Aggregation mechanisms. For instance, some legacy LTE systems may be based on FDD technology, and the 3GPP Release-12 FDD/TDD Carrier Aggregation feature may be required for a suitable combination of existing deployment with LTE LSA modes. It should be noted that the LSA system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

In an example of spectrum sharing using Spectrum Access System (SAS) techniques, a 3GPP LTE network may be operated on licensed shared basis in the 3.55-3.7 GHz frequency band which corresponds to 3GPP LTE Bands 42 and 43. In some cases, SAS may differ from LSA in that licensed spectrum slots may be only available in parts of the entire SAS band (up to 70 MHz) for so-called Primary Access License (PAL or PA) tier-2 users. The remaining part of the spectrum, as well as unused portions of the PAL spectrum ("use-it-or-share-it" rule), may be available to a new user class called General Authorized Access (GAA) tier-3 users. This tier-3 class may not exist in the LSA system definition. GAA users may typically operate LTE Licensed Assisted Access (LSA) or WiFi type systems, and may make modifications in order to be adapted to SAS requirements. For instance, such requirements may be imposed by a governing body, such as the Federal Communication Commission (FCC) or other, in some cases. It should be noted that the SAS system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

It should be noted that both systems, LSA and SAS, may be defined for usage in a specific frequency band. The basic operational principles of those systems, however, may be frequency agnostic in some cases, and may be straightforwardly applied to other bands. For instance, techniques may be applied to 3.5 GHz candidate bands in some cases.

In some embodiments, the shared spectrum may be used in combination with frequency division duplex (FDD) techniques, time division duplex (TDD) techniques and/or carrier aggregation (CA) techniques. As an example, an FDD LTE dedicated licensed band may be operated jointly with a TDD Shared Band using any suitable spectrum sharing technique and frequency band. Non-limiting examples of such may include usage of LSA techniques in a 2.3-2.4 GHz frequency band and/or usage of SAS techniques in a 3.55-3.7 GHz frequency band.

In some embodiments, 3GPP License Assisted Access (LAA) techniques may be used. As an example, 3GPP LAA techniques may be used for combining an FDD dedicated licensed spectrum with the (license-by-rule) 3.5 GHz General Authorized Spectrum (GAA) blocks. In some cases, modified 3GPP LAA techniques may be used. As another example, 3GPP LAA techniques (which may be modified in some cases) may be used for combining Priority Access License (PAL) spectrum blocks in a 3.55-3.7 GHz frequency band with GAA spectrum. In some cases, the PAL blocks may take the role of dedicated licensed spectrum and the GAA spectrum may take the role of unlicensed-spectrum.

Figure 5:
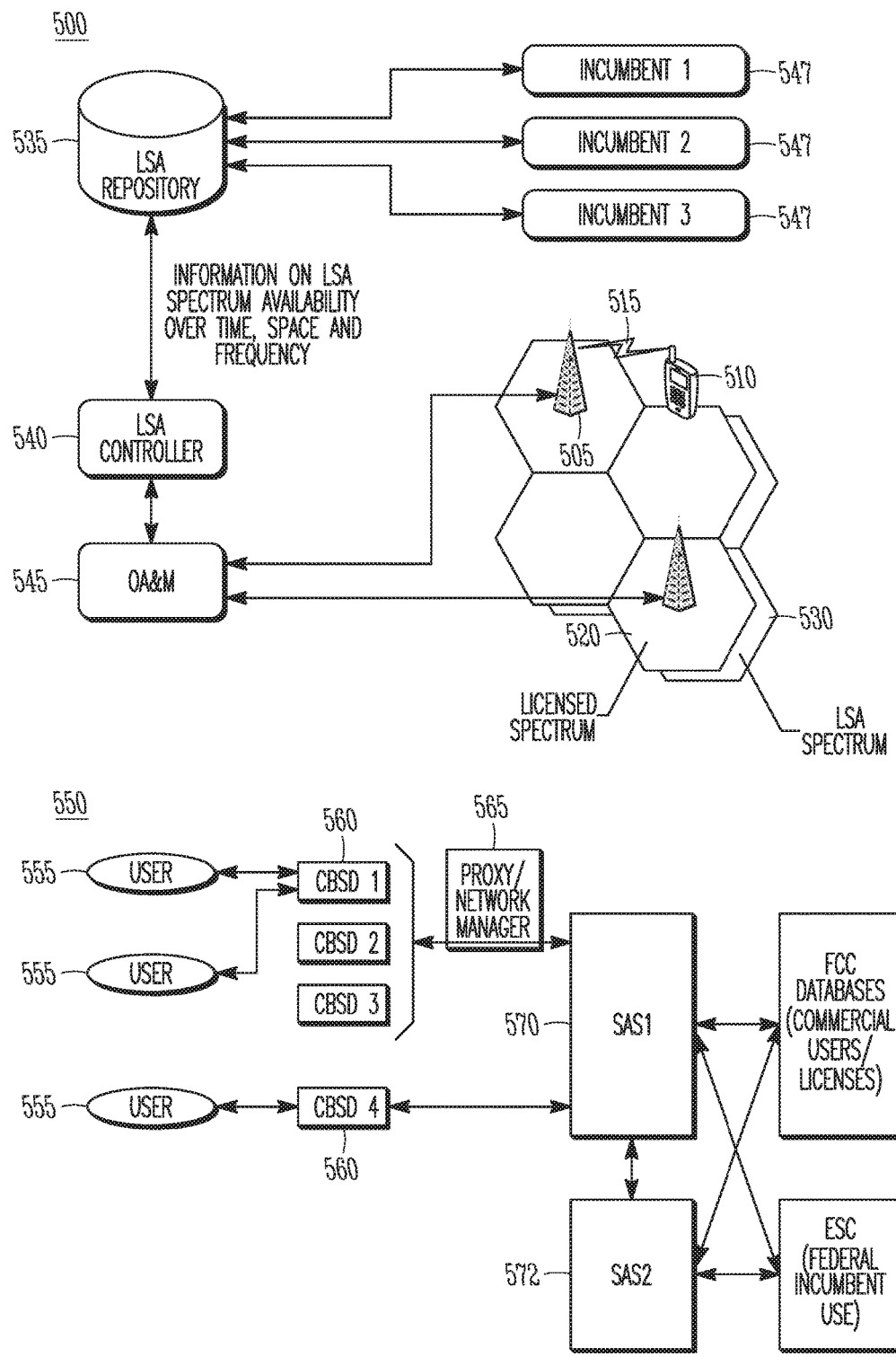
FIG. 5 illustrates an example network for a Licensed Shared Access (LSA) arrangement and an example network for a Spectrum Access System (SAS) arrangement in accordance with some embodiments.

FIG. 5 illustrates an example network for a Licensed Shared Access (LSA) arrangement and an example network for a Spectrum Access System (SAS) arrangement in accordance with some embodiments. It should be noted that embodiments are not limited to the number of eNBs 505, UEs 510, base stations, mobile devices, cells or other elements shown in FIG. 5. Embodiments are also not limited to the type of components shown in FIG. 5 and/or arrangements of the components as shown in FIG. 5. In addition, embodiments are not limited to the usage of eNBs 505 and UEs 510 (which may be arranged to operate according to a 3GPP LTE protocol). For instance, APs, STAs, other base station components and/or other mobile devices may be used in some embodiments.

In the spectrum sharing scenario 500. LSA techniques may be used. The eNB 505 may communicate with a UE 510 over the wireless link 515. As shown in FIG. 5, the top layer of cells 520 may indicate communication (between the eNB 505 and the UE 510, for instance) in dedicated licensed spectrum. The bottom layer of cells 530 may indicate communication in shared spectrum, which may be LSA spectrum in the example scenario 500.

The LSA Repository 535 may be a centralized database that may be used for spectrum management in this scenario 500. The incumbent users 547 may be required to provide a-priori usage information to the LSA repository 535 (or database) on the availability of LSA spectrum over space and time. Depending on this information, the LTE system may be granted access or may be requested to vacate one or more frequency bands through control mechanisms and/or operations that may be performed (at least partly) by the LSA Controller 540. In this operational approach, sensing mechanisms may not necessarily be required to support the system for the identification of incumbent operation.

In some embodiments, one or more of the eNBs 505 may be configured as eNBs 104 configured to operate in the 3GPP network as shown in FIG. 1 and may also be configured to operate as part of a network such as 500, and/or other network described herein for spectrum sharing. Accordingly, such an eNB 104 may communicate with the MME 122, serving GW 124, and PDN GW 126 as part of the operation of the 3GPP network, and may also communicate with components included in networks such as 500 and/or others as part of the spectrum sharing operation. Communication, by the eNB 104, with components in the two networks (3GPP and LSA) may or may not be independent and/or related.

In the spectrum sharing scenario 550, SAS techniques may be used. Embodiments are not limited to the number, arrangement and/or type of base stations used. As an example, one or more Citizens Broadband Service Devices (CBSD) 560 may be used. A CBSD may be or may include a base station component that operates in shared spectrum according to rules defined and/or enforced by a governing body (such as the FCC) or other entity. As another example, one or more eNBs may be used. Embodiments are not limited to the number, arrangement and/or type of mobile devices that may communicate with the CBSDs 560 (or other base station component) in the shared spectrum and/or other spectrum. As an example, any number of users 555 may be used, in which a user may be a mobile device and/or stationary device, such as a UE, STA or other.

In some embodiments, one or more of the CBSDs 560 may be configured as eNBs 104 configured to operate in the 3GPP network as shown in FIG. 1 and may also be configured to operate as part of a network such as 550, and/or other network described herein for spectrum sharing. Accordingly, such an eNB 104 may communicate with the MME 122, serving GW 124, and PDN GW 126 as part of the operation of the 3GPP network, and may also communicate with components included in networks such as 550 and/or others as part of the spectrum sharing operation. Communication, by the eNB 104, with components in the two networks (3GPP and SAS) may or may not be independent and/or related.

In some embodiments, SAS may be designed to ensure coexistence with incumbent users who may not be able to provide any a-priori information to a central database. In some cases, such design considerations may differ in comparison to LSA. In some cases, an Environmental Sensing Capability (ESC) 580 component may perform sensing tasks. As a non-limiting example, the ESC 580 may be included for military applications. In some cases, spectrum access decisions for tier-3 and tier-2 users may be based at least partly on such sensing results. As non-limiting example, unlicensed systems such as Wi-Fi (802.11) or Bluetooth, may be tier-3 users.

As an example, the FCC and/or other entity may mandate and/or advise that a spectrum sharing technique, such as SAS, be used to coordinate usage of shared spectrum between incumbent devices, PA devices and/or GAA devices. Accordingly, it may be mandatory that tier-2 and tier-3 devices communicate with the SAS constantly or at least continuously while operating in the shared spectrum in order to ensure compliance by the tier-2 and/or tier-3 devices.

It should be noted that embodiments and/or exemplary scenarios described herein may involve devices (including PAL user devices for SAS, GAA user devices for SAS, LSA Licensee user devices for LSA, incumbent users for any systems, other mobile devices, and/or other devices) operating and/or arranged to operate according to 3GPP (Third Generation Partnership Project) specifications, such as Long Term Evolution (LTE) and Long Term Evolution-Advanced (LTE-A) and LTE-Advanced Pro. However, it is understood that such embodiments and/or exemplary scenarios may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), 3GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access). HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI OneM2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)). PT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin or "car radio phone"), NMT (Nordic Mobile Telephony). Hicap (High capacity version of NTT (Nippon Telegraph and Telephone)), CDPD (Cellular Digital Packet Data), Mobitex, DataTAC, iDEN (Integrated Digital Enhanced Network). PDC (Personal Digital Cellular). CSD (Circuit Switched Data), PHS (Personal Handyphone System). WiDEN (Wideband Integrated Digital Enhanced Network), iBurst. Unlicensed Mobile Access (UMA, also referred to as also referred to as 3GPP Generic Access Network, or GAN standard)). Wireless Gigabit Alliance (WiGig) standard, mmWave standards in general (wireless systems operating at 10-90 GHz and above such as WiGig, IEEE 802.1 lad, IEEE 802.1 lay and/or others) and/or others. The embodiments and/or examples provided herein are thus understood as being applicable to various other mobile communication technologies, both existing and not yet formulated.

In some cases, such devices may be arranged to support wireless and/or wired communication that may or may not necessarily be defined by a standard, in addition to or instead of the mobile communication technologies and/or standards described above.

As an example, spectrum sharing may be performed and/or implemented in the 2.3-2.4 GHz band. As another example, spectrum sharing may be performed and/or implemented in the 3.55-3.7 GHz band (US). For instance, some embodiments described herein may be applicable to arrangements in which small cells may be used in accordance with SAS techniques in the 3.55-3.7 GHz band. As another example, some or all of the techniques described herein may be applicable to other frequency bands. For instance, broadband wireless communication bands below 6 GHz or cmWave/mmWave bands from 6 GHz to 100 GHz may be used in some cases. In some embodiments, additional techniques may be used for spectrum sharing. For instance, techniques for accommodation of fast adaptation requirements by the incumbents may be used.

Figure 6:
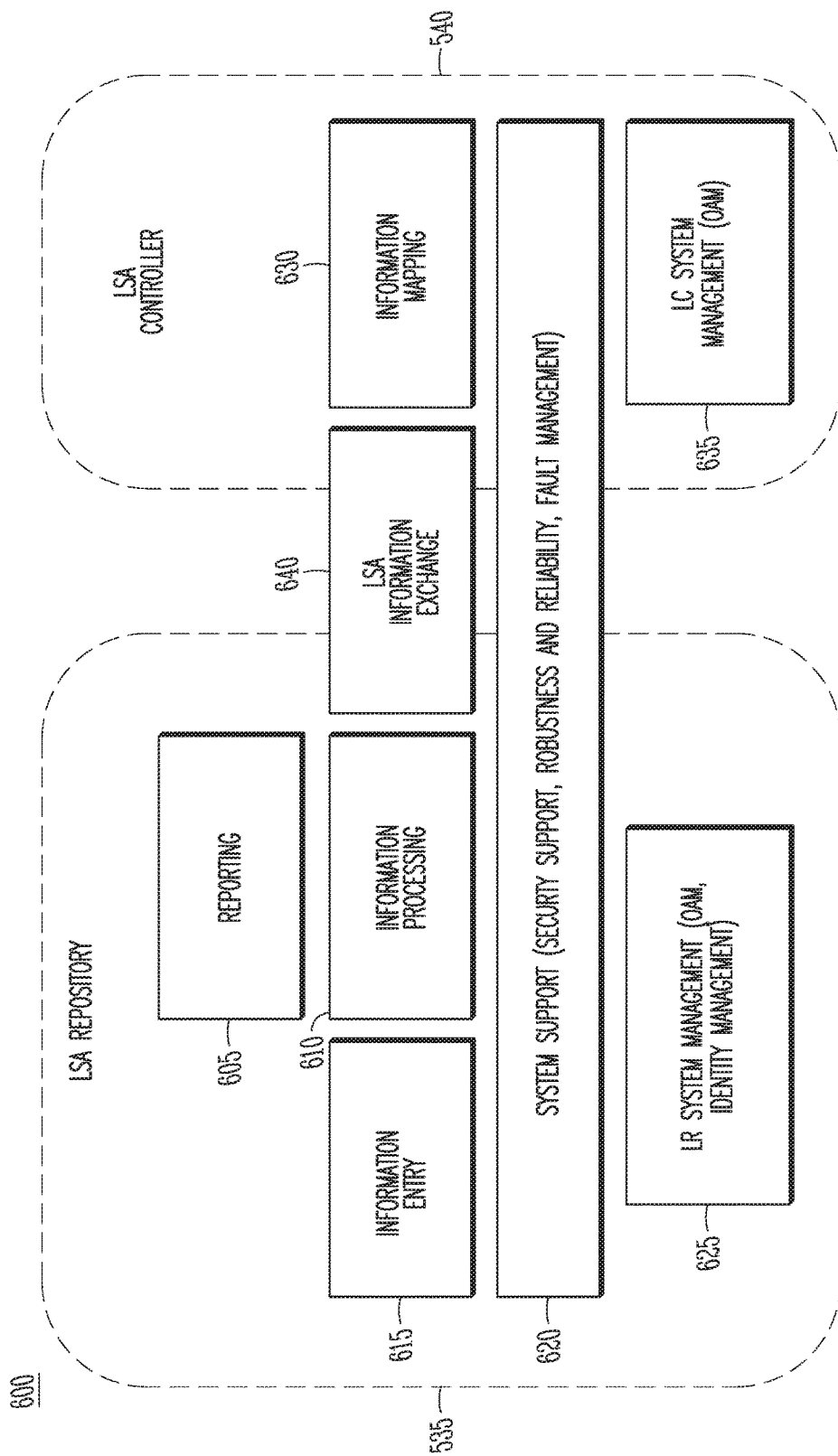
FIG. 6 illustrates an example LSA network architecture in accordance with some embodiments.

FIG. 6 illustrates an example LSA network architecture in accordance with some embodiments. In some embodiments, the network 600 and/or other networks may be used for allocation of shared frequency spectrum for secondary usage. In some cases, the spectrum may be used by an incumbent device for primary usage and/or priority usage. Such spectrum may be used infrequently or for a limited time period in some cases. As an example, a television channel may be off the air during an overnight time period. As another example, radar signals may be transmitted in dedicated spectrum at an infrequent rate.

It should be noted that embodiments are not limited to the number, type and/or arrangement of components shown in the example network 600. Some embodiments may not necessarily include all components shown in the example network 600, and some embodiments may include additional components not shown in FIG. 6. As an example, embodiments are not limited to the usage of the functional blocks shown in the example network 600.

Examples of operations that may be performed by some of the blocks shown in FIG. 6 will be given below, although it is understood that embodiments are not limited by the example operations. In some embodiments, some or all of the blocks may not necessarily perform all operations described below and may perform additional operations in some cases. For instance, in some embodiments, an operation described below may be performed by a different block and/or by multiple blocks. Although a block-oriented approach is illustrated in the example LSA network 600, it is understood that embodiments are not limited to the usage of separate blocks as shown. Accordingly, operations described below may be performed by the example LSA network 600 using any suitable implementation.

In some embodiments, the LSA network 600 may include an LSA controller 540 and an LSA repository 535, which may perform operations as part of various blocks as shown in FIG. 6 and described below. In addition, the LSA information exchange block 640 and system support block 620 may include operations that may be performed by the LSA controller 540, the LSA repository 535 or both, in some cases.

Example operations that may be performed by the LSA information exchange block 640 are described below. It should be noted that in some cases, one or more operations described below may be performed by the LSA Controller 540, LSA Repository 535 and/or both.

In some embodiments, spectrum availability/unavailability information may be made available by the incumbent to the LSA Repository 535. As an example, the spectrum availability/unavailability information may be made available to the LSA Controller 540 (by the LSA Repository 535) either upon request, such as through usage of a pull mechanism in which a pull trigger may be sent from the LSA Controller 540 to the LSA Repository 535. As another example, the spectrum availability/unavailability information may be made available to the LSA Controller 540 through a (cyclic) provision of the information by the LSA Repository 535 without requiring a specific trigger (push mechanism). In some cases, the spectrum availability/unavailability information may be delivered according to intervals (such as once every 30 minutes or other interval). In some cases, the spectrum availability/unavailability information may be delivered upon occurrence of an event, such as when one or more information elements (related to spectrum availability, for instance) changes.

Examples of the spectrum availability/unavailability information sent to the LSA controller 540 may include, but are not limited to, a spectrum availability start time, a spectrum availability end time, a spectrum unavailability start time and/or a spectrum unavailability end time. These times may indicate periods in which spectrum is available or unavailable for usage by the LSA licensee. As an example, starting times may include any or all of a starting year, month, day, hour, minute, second, millisecond, microsecond, other time unit, a number of time intervals, a number of distinct time intervals and/or other parameters. As another example, ending times may include any or all of an ending year, month, day, hour, minute, second, millisecond, microsecond, other time unit, a number of time intervals, a number of distinct time intervals and/or other parameters. As another example, a spectrum unavailability time may indicate a time in which spectrum is unavailable for usage by the LSA licensee or may indicate a time interval outside of which the spectrum is available for usage by the LSA Licensee.

Examples of the spectrum availability/unavailability information sent to the LSA controller 540 may also include, but are not limited to, a spectrum availability frequency band and/or a spectrum unavailability frequency band, which may indicate one or more frequency bands that are available or unavailable for usage by the LSA licensee. As an example, the information may include any or all of a start frequency, stop frequency, frequency band number, a number of frequency bands, a number of distinct frequency bands and/or other parameters.

Examples of the spectrum availability/unavailability information sent to the LSA controller 540 may also include, but are not limited to, a spectrum availability geographic area and/or a spectrum unavailability geographic area, which may indicate one or more geographic areas in which spectrum is available or unavailable for usage by the LSA licensee. As an example, the information may include GPS coordinates, GNSS information, a number of GPS coordinates and/or other parameters, and may describe one or more geographic areas (such as in terms of boundaries, north-west limit, south-east limit or similar). For instance, two or more geographic points may indicate a rectangular shape and/or other shape. In some cases, a geographic area number (such as an index) may be included in the information, in which geographic areas may be predefined and numbered for such cases.

In some embodiments, as part of the LSA information exchange block 640 or otherwise, an information provision trigger may be sent by the LSA Controller 540 to the LSA Repository 535. Examples of such triggers may include, but are not limited to, a request for spectrum availability information and/or a request for spectrum unavailability information. For instance, such requests may include a request to provide a latest availability period (such as a request for latest/next-upcoming spectrum availability period for spectrum usage by LSA Licensee), a request to provide next availability period(s) and/or a number of periods (request for the next "number of periods" spectrum availability periods for spectrum usage by LSA Licensee), a request to provide all availability periods (request for all known next spectrum availability periods for spectrum usage by LSA Licensee) and/or other suitable requests related to spectrum availability. In addition, such requests may also include similar requests related to spectrum unavailability, in some cases.

In some embodiments, as part of the LSA information exchange block 640 or otherwise, kill switch information may be sent by the LSA Controller 540 to the LSA Repository 535. Such information may indicate one or more frequency bands that may need to be vacated in one or more geographic areas during one or more time periods. Examples of such information may include, but are not limited to, a starting time and/or ending time (year, month, day, hour, minute, second, millisecond, microsecond and/or other time unit), a start frequency, a stop frequency, a frequency band number, GPS coordinates limiting a geographic area (such as GPS, GNSS and/or other coordinates that may define boundaries for a geographic area, a number of GPS coordinates (number of GPS coordinates provided per geographic area), a number of availability areas (number of geographic areas provided), a geographic area number (in which geographic areas may be predefined and numbered according to an index).

In some embodiments, as part of the LSA information exchange block 640 or otherwise, an LSA Repository heartbeat message may be sent from the LSA Repository 535 to the LSA Controller 540 to indicate an availability of the LSA Repository 535. In some embodiments, as part of the LSA information exchange block 640 or otherwise, an LSA Controller heartbeat message may be sent from the LSA Controller 540 to the LSA Repository 535 to indicate an availability of the LSA Controller 540.

Referring back to FIG. 6, the system support block 620 may perform operations related to security support, robustness, reliability, fault management and/or other aspects. Example operations that may be performed by the system support block 620 are described below. It should be noted that in some cases, one or more operations described below may be performed by the LSA Controller 540, LSA Repository 535 and/or both.

In some embodiments, as part of the system support block 620 or otherwise, the LSA Repository 535 [LSA Controller 540] may report that a malicious attack has occurred and/or has been detected. Related information to be reported may include an attack type, such as denial of service, man in the middle, alteration of information/data, substitution of functional entities, zero-level attack, attack through weakness of the system, attack of encryption and/or other types of attack. The related information to be reported may also include a severity level, such as low, medium, high, critical and/or other level. For instance, depending on the severity level, one or more countermeasures may be initiated in some cases. An example countermeasure may include prevention of the target LSA Licensee from using some or all of the LSA spectrum. Another example countermeasure may include reporting of events to higher entities (such as a super-user, manager, maintenance user, and/or other user of the LSA Repository 535 and/or LSA Controller 540, a Network Operator representative, an Incumbent representative and/or other higher entity). The related information reported may also be related to a time of attack (start year, start month, start day, start hour, start minute, start second, start millisecond, start microsecond and/or other). The related information reported may also be related to a number of attacks. The related information reported may also be related to an attacked entity, such as which system entity is affected by one or more attacks and at which level. In addition, a reset or substitution of entities (such as the affected entities or all entities) may be requested. Such entities may be identified, in some cases, by an ID such as a numeric ID, alpha-numerical ID and/or other ID.

In some embodiments, as part of the system support block 620 or otherwise, the LSA Repository 535 [LSA Controller 540] may select security measures as part of the operation. As an example, the LSA Repository 535 [LSA Controller 540] may request that the LSA Controller 540 [LSA Repository 535] to use a type of encryption, authentication and/or other suitable security mechanism for information exchange. Such security mechanisms may be pre-defined in some cases.

In some embodiments, as part of the system support block 620 or otherwise, an LSA Repository heartbeat message may be sent from the LSA Repository 535 to the LSA Controller 540 to indicate an availability of the LSA Repository 535. In some embodiments, as part of the system support block 620 or otherwise, an LSA Controller heartbeat message may be sent from the LSA Controller 540 to the LSA Repository 535 to indicate an availability of the LSA Controller 540.

In some embodiments, as part of the system support block 620 or otherwise, the LSA Repository 535 [LSA Controller 540] may report failures to each other. As an example, an internal failure of the LSA Repository 535 [LSA Controller 540] may be reported to the LSA Controller 540 [LSA Repository 535]. As another example, the LSA Repository 535 [LSA Controller 540] may indicate an observation of failure in the LSA Controller 540 [LSA Repository 535]. Information exchanged as part of these and other examples may include, but is not limited to, a failure source (such as whether failure has occurred in the LSA Repository 535 [LSA Controller 540] or has been observed in the LSA Controller 540 [LSA Repository 535]), a severity level of a failure (such as low, medium, high, critical and/or other level) and/or other information. In some cases, depending on the level of severity of the failure, certain countermeasures may be initiated, including prevention of one or more LSA Licensees from using some or all of the LSA spectrum, reporting of events to higher entities (such as those described elsewhere and/or others) and/or other countermeasures.

Information exchanged as part of the failure reporting may also include a failure type. Examples of failure types are given below, but it is understood that embodiments are not limited to these examples. An example failure type may include an "unexpected information" type, in which an unexpected information element may be provided, the source of which may be requested to come back to a safe state in some cases. Another example failure type may include an "erroneous information" type, in which a provided information element cannot be decoded correctly, due to an erroneous transmission, an erroneous composition of the information and/or other reason. In such a case, a retransmission may be requested. If this retransmission fails, the source may be requested to come back to a safe state. Another example failure type may include a "no response" type, in which a message from the source may be expected but no information element is provided. The message may include a heartbeat signal, a response to request for available resources and/or other signal. In some cases, the source may be requested to come back to a safe state. Another example failure type may include a "wrong configuration" type, in which the source may be identified to operate in a wrong/unexpected state. For instance, the LSA Repository 535 [LSA Controller 540] may identify (using sensing and/or other techniques) that the LSA Controller 540 [LSA Repository 535] is operating and/or granting usage in frequency bands which are not available for LSA Licensees. In some cases, the source may be requested to come back to a safe state. Another example failure type may include a "going out of order" type, in which the LSA Repository 535 [LSA Controller 540] may announce, to the LSA Controller 540 [LSA Repository 535] or other suitable entity, that it is going out of service or out of order. In some cases, the LSA Controller 540 [LSA Repository 535] may be requested to connect to a different LSA Repository 535 [LSA Controller 540] (if available) or to seize the usage of the concerned LSA band.

Referring back to FIG. 6, example operations that may be performed by the information mapping block 630 are described below. It should be noted that in some cases, one or more operations described below may be performed by the LSA Controller 540, although embodiments are not limited as such.

In some embodiments, as part of the information mapping block 630 or otherwise, the LC Controller 540 may receive spectrum availability information either directly from the LSA Repository 535 or through interaction with the LSA Information Exchange block 640. For instance, information on spectrum availability/unavailability in time, frequency (bands) and/or geographic area(s) may be received. Although not limited as such, some or all of the information described regarding the LSA Information Exchange block 640 may be received at the LC Controller 540.

In some embodiments, as part of the information mapping block 630 or otherwise, the LC Controller 540 may exchange information related to confirmation of reception of spectrum availability information either directly from the LSA Repository or through interaction with the LSA Information Exchange block 640. Example information types may include, but are not limited to, "spectrum availability information received" (that is, an acknowledgement that the information was correctly received), "spectrum availability information partly received" (that is, an acknowledgement that part of the information was correctly received and/or that a retransmission needs to be initiated), "spectrum availability information erroneous" (that is, information was incorrectly received and/or needs to be retransmitted, "information missing" (that is, information was expected to be delivered but it did not reach the destination), "information validity" (that is, an indication of which time interval(s), which frequency band(s) and/or for which geographic area for which the reception is confirmed).

In some embodiments, as part of the information mapping block 630 or otherwise, the LC Controller 540 may exchange information related to confirmation of reception triggers. Example information types may include, but are not limited to, a trigger type (such as a kill switch, a trigger for delivering information and/or other trigger), "trigger received" (that is, a trigger message was correctly received and will be processed), "trigger erroneous" (that is, a trigger message was incorrectly received and/or needs to be retransmitted), "trigger missing" (that is, a trigger was expected to be received but no message reached the destination), "confirm trigger execution" (that is, a processing of a trigger is confirmed, such as an emergency vacating of the target band has been executed in case of a kill switch).

In some embodiments, as part of the information mapping block 630 or otherwise, the LC Controller 540 may exchange information related to configuration of the MFCN. In some cases, depending on received spectrum availability information, the possible usage of newly available/unavailable (shared) frequency bands may be communicated to the MFCN (operator network). Information types may include, but are not limited to, frequency band availability (which may indicate which frequency band(s) is (are) available for which time period and over which geographic area), frequency band unavailability (which may indicate which frequency band(s) is (are) unavailable for which time period and over which geographic area), a kill switch (which may indicate which frequency band(s) need(s) to be vacated, when the frequency band(s) need(s) to be vacated and/or over which geographic area(s) the frequency band(s) need(s) to be vacated.

Referring back to FIG. 6, example operations that may be performed by one or both of the system management blocks 625, 635 are described below. It should be noted that one or more operations described below may be performed by the system management blocks 625 of the LSA Repository 535, in some cases. In addition, one or more of the operations described below may be performed by the system management blocks 635 of the LSA Controller 540, in some cases.

In some embodiments, as part of the system management blocks 625 and/or 635 or otherwise, operation tasks, administration and/or maintenance tasks in the LSA System may be performed. In addition, identity management tasks, such as management of user identity, authentication and/or user authorization profiles, may be performed as part of the system management blocks 625 and/or 635 or otherwise.

As an example, an "Administration Mode," such as a superuser, supervisor, administration and/or management mode may be activated. Such a mode may provide access to internal LSA system information. An authentication of the requestor may be performed (that is, authorization details may be provided to assure that the requestor is authorized to activate the administration mode). A type of administration mode may be activated in some cases. Example types may include "deep inspection" (which may allow access to all relevant parameters and information elements); "average inspection" (which may allow access to selected elements); "light inspection" (which may allow access to some basic (limited) parameters and/or information elements); and/or other types. An activation period over which the administration mode may and/or should be active (such as a number of seconds, minutes, hours, days and/or other time unit) may be indicated in some cases.

As another example, an authentication may be performed, in which access rights in the LSA Controller 540 and/or the LSA Repository 535 may be authenticated. Related information types and/or parameters may include, but are not limited to, an authentication ID, such as an identifier of a party requesting authentication; an authentication code, such as a password or similar identification code of indicated ID; a de-authentication ID, such as an ID to be de-authenticated for which access to the system may be interrupted; an authentication level, such as a "super user" that may request access to all types of relevant functions, a "privileged user" that may request access to an extended (pre-defined) set of functions, a "standard user" that may request access to a standard (pre-defined) set of functions, a "visitor user" that may request access to a restricted (pre-defined) set of functions and/or other user type; an authentication period (which may be given in seconds, minutes, hours, days and/or other time unit) over which the authentication may be active, should be active and/or after which the user may be automatically de-authenticated; a user profile which may provide user profile information such as a name, email address, user privileges, user preferences, access rights, access limitations, usage history information and/or other information.

Referring back to FIG. 6, example operations that may be performed by the reporting block 605 are described below. It should be noted that in some cases, one or more operations described below may be performed by the LSA Repository 535, although embodiments are not limited as such.

In some embodiments, as part of the reporting block 605 or otherwise, the LSA Repository 535 may receive a trigger for reporting, such as a request for an immediate creation of reports or a request for a cyclic (repeated after certain interval(s)) creation of reports indicating the usage of the LSA Spectrum. Examples of such requests may include, but are not limited to, "trigger immediate reporting" (request for immediate provision of report on usage of LSA resources), "cyclic request for reporting" (request for cyclic delivery of report on usage of LSA resources, which may indicate a repetition time for delivery, which may be defined by seconds, minutes, hours, days and/or other time unit in some cases); "trigger stop reporting" (request for stopping (cyclic) delivery of report on usage on LSA resources), "requested reporting interval" (which may indicate one or more time periods for which the usage of LSA resources is to be reported, which may be defined by seconds, minutes, hours, days and/or other time unit in some cases).

In some embodiments, as part of the reporting block 605 or otherwise, the LSA Repository 535 may confirm a reception of a trigger for reporting, such as a request for an immediate and/or cyclic creation of a report on usage of LSA resources. Related information elements and/or parameters may include, but are not limited to, "confirm trigger reception" (which may confirm successful reception of a trigger), "erroneous trigger reception" (which may indicate that reception of trigger was not successful) and/or other.

In some embodiments, as part of the reporting block 605 or otherwise, the LSA Repository 535 may deliver a report on usage of LSA resources. Related information elements and/or parameters may include, but are not limited to, an LSA usage period, which may indicate time period(s) for usage of the LSA resources, related geographic area(s), related frequency band(s) where LSA resources have been used; output power levels, which may indicate output power levels applied for eNBs, base stations, UEs, mobile devices and/or other devices operating in LSA spectrum; a number of LSA UEs, which may be UEs that operate and/or have operated in LSA bands; geographic areas and/or frequency bands in which the LSA UEs operate and/or have operated; a combination of LSA bands, such as which LSA bands have been combined through FDD/TDD Carrier Aggregation and/or other techniques, other bands (such as dedicated licensed bands and/or other bands) with which the LSA bands have been combined; access requests, which may indicate types of access requests, such as which super-users, privileged users, standard users and/or other users have obtained access; failure events, such as types and/or times of failure events that have occurred. As an example of a failure event, an information exchange between LSA Repository 535 and LSA Controller 540 (or related OD/NOD functions) may operate incorrectly. As another example of a failure event, one or more malicious attacks may occur. Other failure events described herein may also be applicable.

Referring back to FIG. 6, example operations that may be performed by the information processing block 610 are described below. It should be noted that in some cases, one or more operations described below may be performed by the LSA Repository 535, although embodiments are not limited as such.

In some embodiments, as part of the information processing block 610 or otherwise, the LSA Repository 535 may process information elements and/or exchange messages including, but not limited to, those described below. As an example, a "request information for processing" information element may provide a list of LSA operation related parameters to be delivered. Although not limited as such, the operation parameters may include some or all of those described herein related to other blocks of FIG. 6 and/or other operation parameters. As another example, a "delivery information for processing" information element may provide requested LSA operation related parameters. Although not limited as such, the operation parameters may include some or all of those described herein related to other blocks of FIG. 6 and/or other operation parameters. As another example, a "confirm reception of information for processing" information element may confirm a reception of requested LSA operation related parameters. Although not limited as such, the operation parameters may include some or all of those described herein related to other blocks of FIG. 6 and/or other operation parameters. For instance, a "confirm reception" parameter may confirm successful reception of information and an "erroneous reception" parameter may indicate that reception was not successful.

Referring back to FIG. 6, example operations that may be performed by the information entry block 615 are described below. It should be noted that in some cases, one or more operations described below may be performed by the LSA Repository 535, although embodiments are not limited as such.

In some embodiments, as part of the information processing block 615 or otherwise, the LSA Repository 535 may process information elements and/or exchange messages including, but not limited to, those described below. As an example, a "request information to LSA system" information element may provide a list of LSA operation related parameters to be delivered. Although not limited as such, the operation parameters may include some or all of those described herein related to other blocks of FIG. 6 and/or other operation parameters. For instance, information on a sharing agreements between incumbent(s) and LSA Licensee(s); an indicator of stakeholder identities (incumbents/ LSA Licensees); a validity period of sharing agreement (such as a start time and/or end time); sharing conditions (under which conditions the LSA Licensee may be allowed to use the spectrum, whether spectrum is declared to be available by the incumbent to LSA Repository 535 and/or other sharing conditions; sharing obligations (such as obligations for LSA Licensee to be allowed to use the spectrum, payment of a specific amount of money during a usage period and/or other sharing obligations.

As another example, a "delivery information to LSA system" information element may provide requested LSA operation related parameters. Although not limited as such, the operation parameters may include some or all of those described herein related to other blocks of FIG. 6 and/or other operation parameters. For instance, some or all of the parameters described regarding the "request information to LSA system" information element may be used, in some cases.

As another example, a "confirm reception to LSA system" information element may confirm reception of requested LSA operation related parameters. Although not limited as such, the operation parameters may include some or all of those described herein related to other blocks of FIG. 6 and/or other operation parameters. For instance, some or all of the parameters described regarding the "request information to LSA system" information element may be used, in some cases. In addition, other parameters such as "confirm reception" (which may confirm successful reception of information), "erroneous reception" (which may indicate that reception was not successful) and/or others may be used, in some cases.

Figure 7:
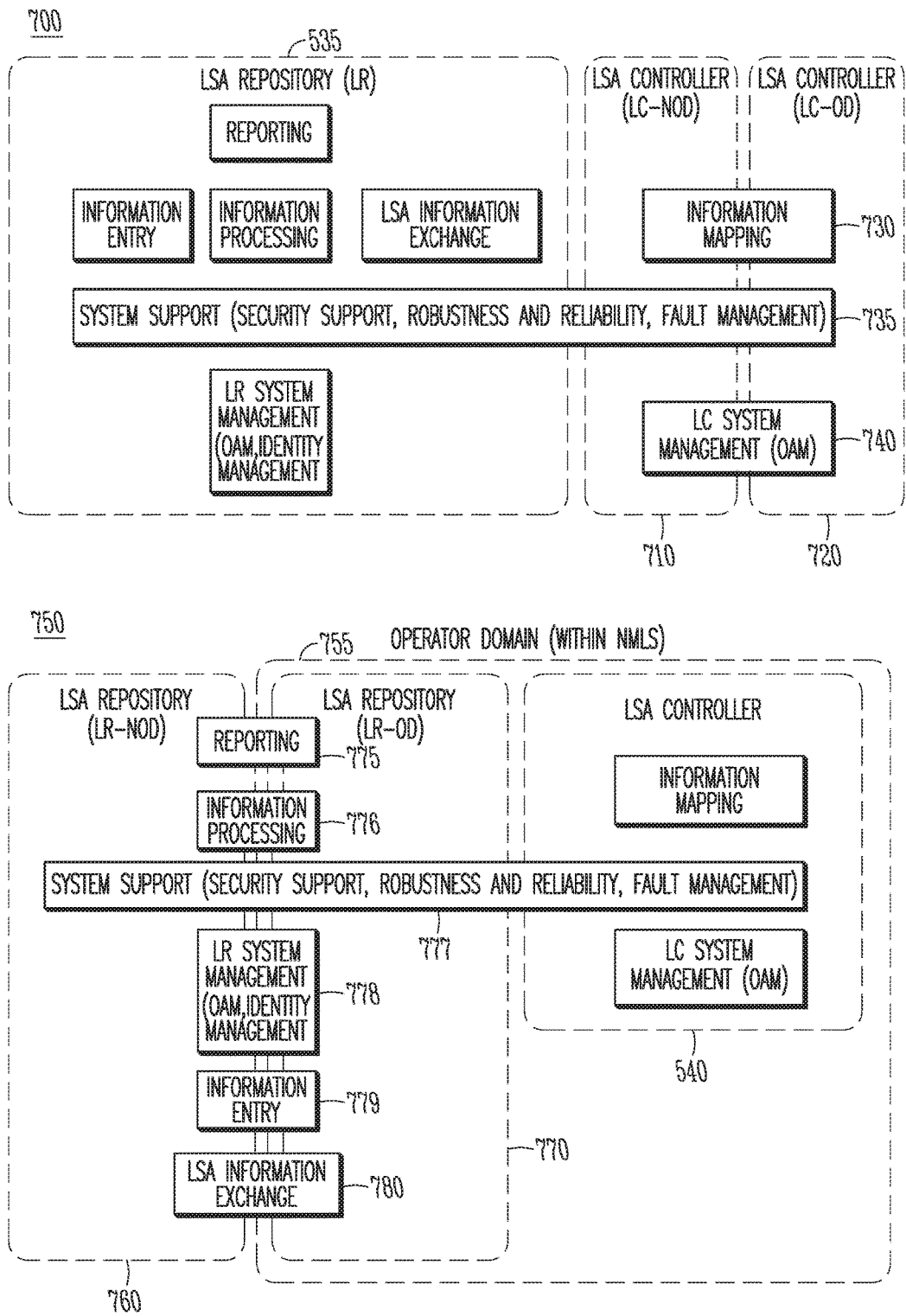
FIG. 7 illustrates an example network architecture in which an LSA Controller may be divided and an example network architecture in which an LSA Repository may be divided in accordance with some embodiments.

FIG. 7 illustrates an example network architecture in which an LSA Controller may be divided and an example network architecture in which an LSA Repository may be divided in accordance with some embodiments. It should be noted that embodiments are not limited to the number, type and/or arrangement of blocks in the example LSA networks 700, 750 shown in FIG. 7. In some embodiments, some or all of the operations described regarding the example LSA network 600 may be performed by one or more blocks of the example LSA networks 700, 750, although the scope of embodiments is not limited in this respect.

In the example LSA network 700, the LSA Repository 535 and a first portion (710) of the LSA Controller 540 may be excluded from, may be outside of or may operate externally to an operator network. A second portion (720) of the LSA Controller 540 may be included in, may be part of or may operate internally to the operator network. In these and other cases, portions of the LSA Controller outside of and inside of the operator network may be referred to as a "non-operator domain LSA Controller" (LC-NOD) 710 and an "operator domain LSA Controller" (LC-OD) 720, respectively.

In some embodiments (such as the example LSA network 700), the LSA Controller 540 may be divided in terms of functionality, available information and/or other aspects. As shown in the example LSA network 700 in FIG. 7, the information mapping block 730, the system support block 735 and/or the LC system management block 740 (which may perform some or all of the operations described regarding similar blocks in FIG. 6) may be split across the LC-NOD 710 and the LC-OD 720 in some embodiments. In some embodiments, one or more functionalities (or sub-functionalities) may be split between the LC-OD 720 and the LC-NOD 710. As an example, operations and/or functions related to the information mapping block 730, system support block 735 and/or the LC system management block 740 may be split between the LC-NOD 710 and the LC-OD 720. It should also be noted that the "LSA information exchange" block and its related operations may or may not be partly in the LC-OD 720 in some cases, which may depend on implementation.

As an example, some or all operator critical information may be managed within the LC-OD 720 while generic information may be available in the LC-NOD 710. As another example, all information confidential to a single operator may be treated within the domain of that operator (i.e. within the concerned LC-OD 720 (located in an NMLS, to be described below). Non-confidential information may be processed outside of the Operator's domain within the LC-NOD 710. Such arrangements may have an advantage that some confidential information may be maintained within the operator network. Such arrangements may have a disadvantage that some information may be available outside of the operator network.

In the example LSA network 750, a first portion of the LSA Repository 535 may be excluded from, may be outside of or may operate externally to an operator network. A second portion of the LSA Repository 535 and an LSA Controller 540 may be included in, may be part of or may operate internally to the operator network. In these and other cases, portions of the LSA Repository 535 outside of and inside of the operator network may be referred to as a "non-operator domain LSA Repository" (LR-NOD) 760 and an "operator domain LSA Controller" (LR-OD) 770, respectively. In the example network 750, the LSA Repository 535 may be divided (in terms of functionality, available information and/or other aspects) into the LR-NOD 760 and the LR-OD 770.

As an example, some or all operator critical information may be managed within the LR-OD 770 while generic information may be available in the LR-NOD 710. As another example, all information confidential to a single operator may be treated within the domain of that operator (i.e. within the concerned LR-OD 770 (located in an NMLS, to be described below). Non-confidential information may be processed outside of the Operator's domain within the LR-NOD 760. In some cases, such an arrangement may have an advantage that external access to information may be minimized or reduced. Such arrangements may have a disadvantage that joint control of multiple networks may be challenging without a central LSA Control entity. In some cases, some or all information confidential to an operator may be treated within the domain of the operator, In some embodiments (such as the example networks 700, 750), such a splitting of the LSA Repository 535 and/or LSA Controller 540 across an MNO domain may be performed to maintain confidentiality within the MNO network of data, user data, network data, configuration data, deployment data and/or other types of data (or at least to maintain a portion of such data as confidential). Such a splitting may also be performed to enable the mobile network operator (MNO) to maintain control (or at least partial control) of various operations such as those described previously regarding FIG. 6 and/or other operations. In some embodiments, some or all information processed in the MNO domain may be (operator) confidential information which should not be communicated outside of the MNO domain (that is, to a Non-MNO Domain). A split of functionality between MNO domain and Non-MNO domain may serve to forward and/or manage information elements, configuration information and/or other information. Accordingly, an operation may be performed in such a way that relevant information may be provided from the MNO domain to the Non-MNO domain and vice versa, but may be performed in accordance with maintenance of the operator confidential information within the MNO domain.

It should be noted that embodiments in which spectrum sharing controller and/or spectrum sharing repository components are divided across multiple domains are not limited to LSA techniques. In some embodiments, SAS techniques may be used in accordance with a division of operations and/or data across the operator domain and non-operator domain. In such cases, the "LSA Repository" may be replaced by an "SAS Repository". The "LC NOD" may be replaced by a "SAS-C NOD" (SAS Controller Non-Operator Domain). The LC OD may be replaced by an "SAS-C OD" (SAS Controller Operator Domain). In such embodiments, an objective may be to maintain SAS information in the operator domain.

Figure 8:
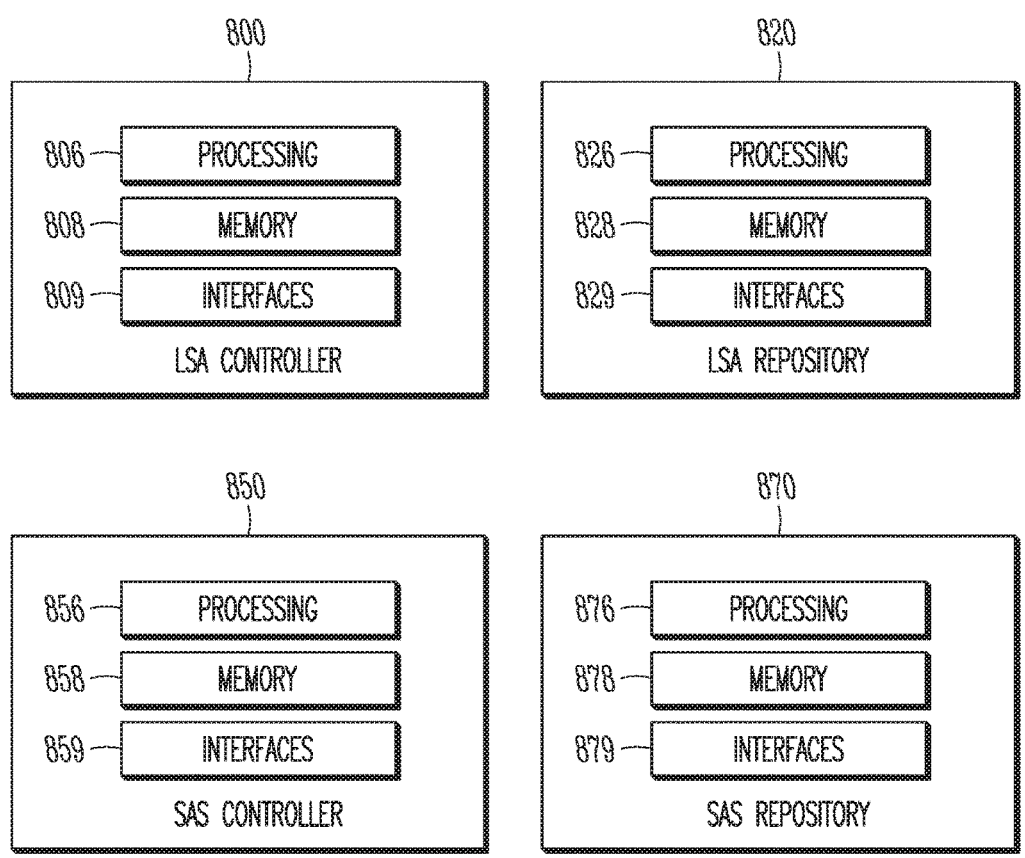
FIG. 8 illustrates example block diagrams for an LSA Controller, LSA Repository, SAS Controller and SAS Repository in accordance with some embodiments.

FIG. 8 illustrates example block diagrams of an LSA Controller, LSA Repository, SAS Controller, and SAS Repository in accordance with some embodiments. The LSA Controller 800 may be suitable for use as an LSA Controller 540 as depicted in FIG. 5 and elsewhere herein, in some embodiments. The LSA Repository 820 may be suitable for use as an LSA Repository 535 as depicted in FIG. 5 and elsewhere herein, in some embodiments. The SAS Controller 850 may be suitable for use as an SAS Controller 570 as depicted in FIG. 5 and elsewhere herein, in some embodiments.

It should also be noted that any or all of the LSA Controller 800, LSA Repository 820, SAS Controller 850, and SAS Repository 870 may be configured to operate internal to and/or external to an operator network, as described previously. In some embodiments, the LSA Controller 800 may be configured to operate as an LC-OD and/or LC-NOD. In some embodiments, the LSA Repository 820 may be configured to operate as an LR-OD and/or LR-NOD. In some embodiments, the SAS Controller 850 may be configured to operate as an operator domain SAS Controller and/or a non-operator domain SAS Controller. In some embodiments, the SAS Repository 870 may be configured to operate as an operator domain SAS Repository and/or a non-operator domain SAS Repository.

The LSA Controller 800 may include processing circuitry 806 and memory 808 arranged to perform the operations described herein. The LSA Controller 800 may also include one or more interfaces 809, which may enable communication with other components, including the LSA Repository 820, eNBs and/or other components. The interfaces 809 may be wired or wireless or a combination thereof. The LSA Repository 820 may include processing circuitry 826 and memory 828 arranged to perform the operations described herein. The LSA Repository 820 may also include one or more interfaces 829, which may enable communication with other components, including the LSA Controller 800, eNBs and/or other components. The interfaces 829 may be wired or wireless or a combination thereof.

The SAS Controller 850 may include processing circuitry 856 and memory 858 arranged to perform the operations described herein. The SAS Controller 850 may also include one or more interfaces 859, which may enable communication with other components, including the SAS Repository 870, eNBs and/or other components. The interfaces 859 may be wired or wireless or a combination thereof. The SAS Repository 870 may include processing circuitry 876 and memory 878 arranged to perform the operations described herein. The SAS Repository 870 may also include one or more interfaces 879, which may enable communication with other components, including the SAS Controller 850, eNBs and/or other components. The interfaces 879 may be wired or wireless or a combination thereof.

It should be noted that in some embodiments, an LSA Controller may include some or all of the components shown in either FIG. 2 or FIG. 8 or both. It should be noted that in some embodiments, an LSA Repository may include some or all of the components shown in either FIG. 2 or FIG. 8 or both. It should be noted that in some embodiments, an SAS Controller may include some or all of the components shown in either FIG. 2 or FIG. 8 or both. It should be noted that in some embodiments, an SAS Repository may include some or all of the components shown in either FIG. 2 or FIG. 8 or both.

Although the LSA Controller 800, LSA Repository 820, SAS Controller 850 and the SAS Repository 870 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by an LSA Controller may include various components of the LSA Controller 800 as shown in FIG. 8 and/or the machine 200 as shown in FIG. 2. In some embodiments, an apparatus used by an LSA Repository may include various components of the LSA Repository 800 as shown in FIG. 8 and/or the machine 200 as shown in FIG. 2. In some embodiments, an apparatus used by an SAS Controller may include various components of the SAS Controller 850 as shown in FIG. 8 and/or the machine 200 as shown in FIG. 2. In some embodiments, an apparatus used by an SAS Repository may include various components of the SAS Repository 870 as shown in FIG. 8 and/or the machine 200 as shown in FIG. 2.

Figure 9:
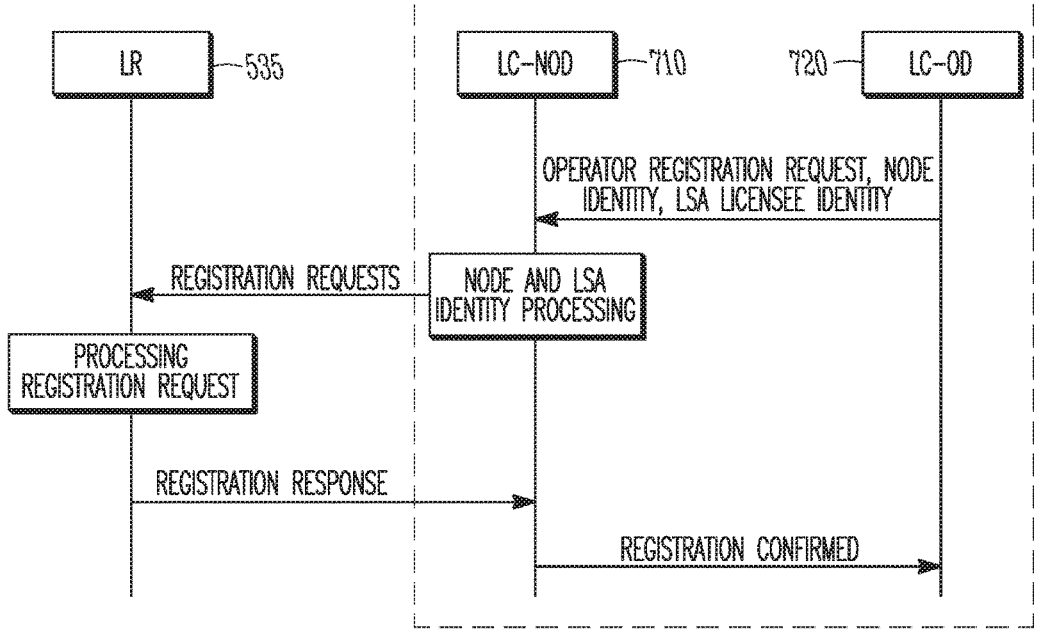
FIG. 9 illustrates examples of registration and de-registration operations in accordance with some embodiments.
Figure 9:
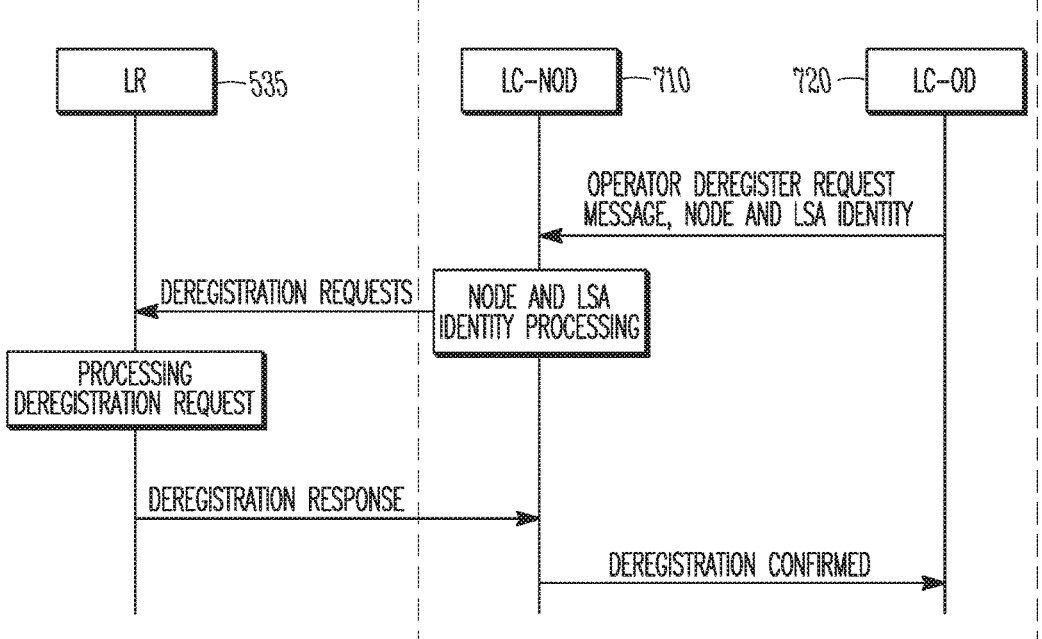
Figure 10:
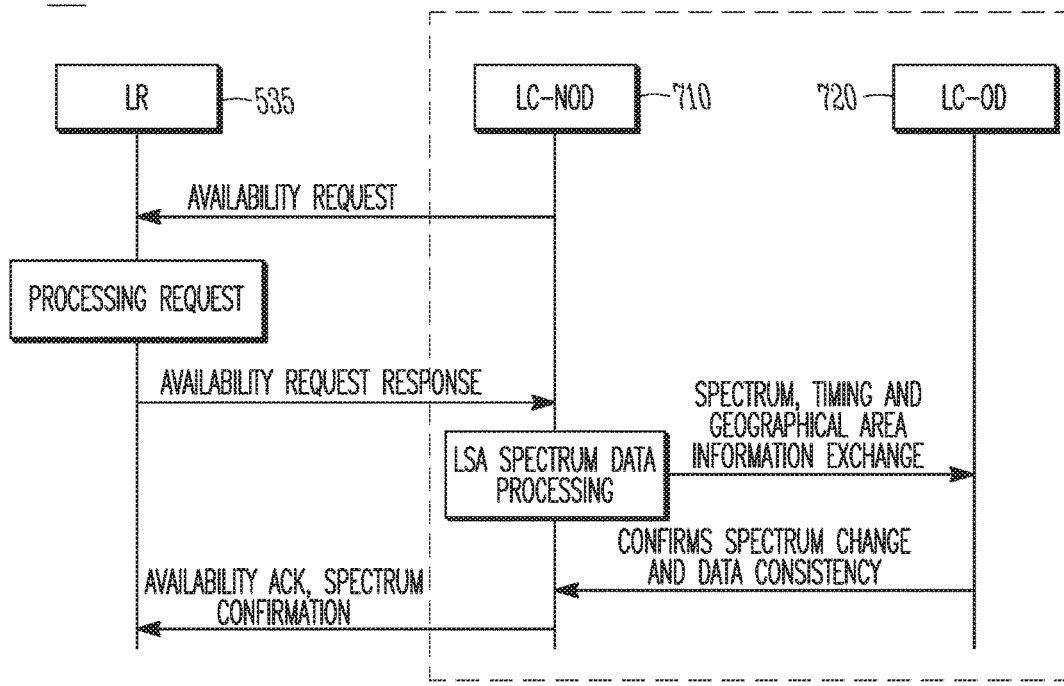
FIG. 10 illustrates examples of resource request, availability confirmation, and connectivity check operations in accordance with some embodiments.
Figure 10:
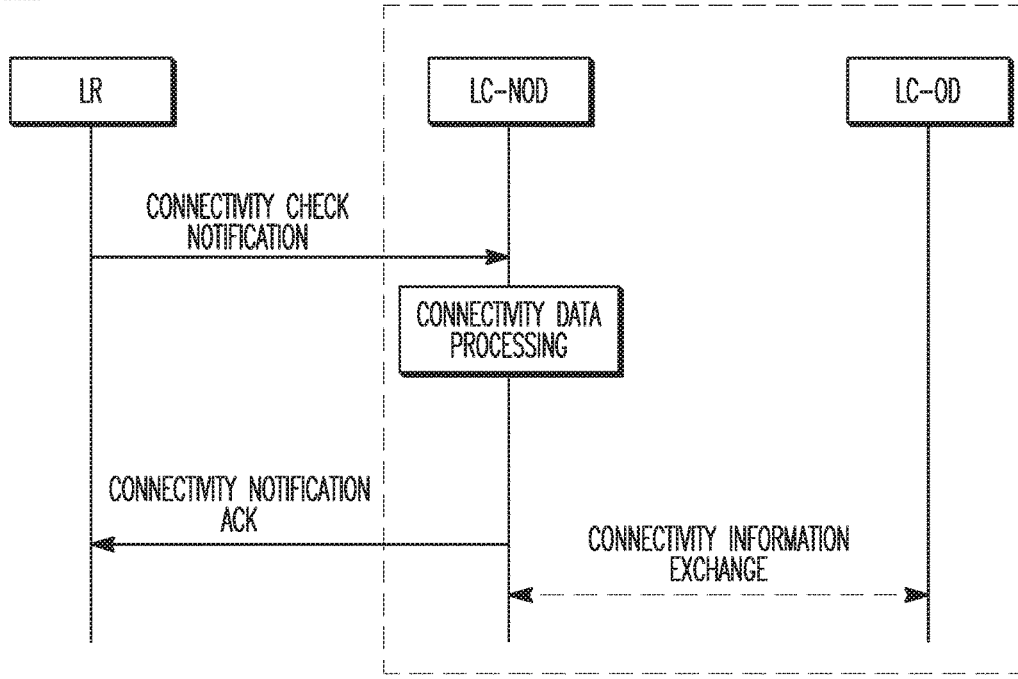

FIG. 9 illustrates examples of registration and de-registration operations in accordance with some embodiments. FIG. 10 illustrates examples of resource request, availability confirmation, and connectivity check operations in accordance with some embodiments. It should be noted that the examples related to performance of operations by the LC-OD 720 and the LC-NOD 710 shown in FIGS. 9-10 may illustrate concepts and/or techniques described herein, but it is understood that embodiments are not limited to these examples. In some embodiments, other suitable operations and/or functionalities may be performed in a similar manner by the LC-OD 720 and the LC-NOD 710. In addition, embodiments are not limited to the operations shown in FIGS. 9-10, as some embodiments may not necessarily include all operations shown and some embodiments may include additional operations. Embodiments are also not limited to the chronological ordering shown in FIGS. 9-10.

Referring to FIG. 9, in the examples of registration 900 and de-registration 950, the LC-OD 720 may be responsible for some or all operator requests to register and/or de-register with the LR 535. Accordingly, some or all LC-OD requests for registration and/or de-registration with a node identity and/or LSA licensee identity may be sent to the LC-NOD for processing. The requests may be sent as anonymous, public, non-confidential or similar requests, in some cases, which may depend on a level of confidentiality for the network. The LC-NOD 710 may be responsible for establishing and maintaining communication with the LR 535, in some embodiments.

In some embodiments, an identity of an eNB 535, base station and/or other LSA licensee may be obfuscated by the LC-OD 720 before sending the request for registration and/or de-registration to the LC-NOD 710.

Referring to FIG. 10, in the example of a resource request and availability confirmation 1000, an operator may make a request for spectrum and may confirm necessary and/or requested changes once the LR 535 notifies on spectrum resource availability. The LC-NOD 710 and LR 535 may exchange information on LSA spectrum resource availability. The LC-NOD 710 may perform spectrum data processing and may maintain communication with the LC-OD 720 on available spectrum, geographical area and timing instructions, in some cases. The LC-OD 720 may check consistency of provided information and may confirm spectrum changes to the operator. In some embodiments, an identity of an eNB 535, base station and/or other LSA licensee may be obfuscated by the LC-OD 720 when communicating with the LC-NOD 710.

In the example of a connectivity check 1050 shown in FIG. 10, a connectivity check may be maintained outside of the operator domain. That is, the LC-NOD 710 and the LR 535 may exchange information on connectivity status. The LC-NOD 710 may process the connectivity check notification and may take action upon a connectivity check response status, in some cases. Such processing may be dependent on implementation, in some cases. In some embodiments, an identity of an eNB 535, base station and/or other LSA licensee may be obfuscated by the LC-OD 720 when communicating with the LC-NOD 710.

Figure 11:
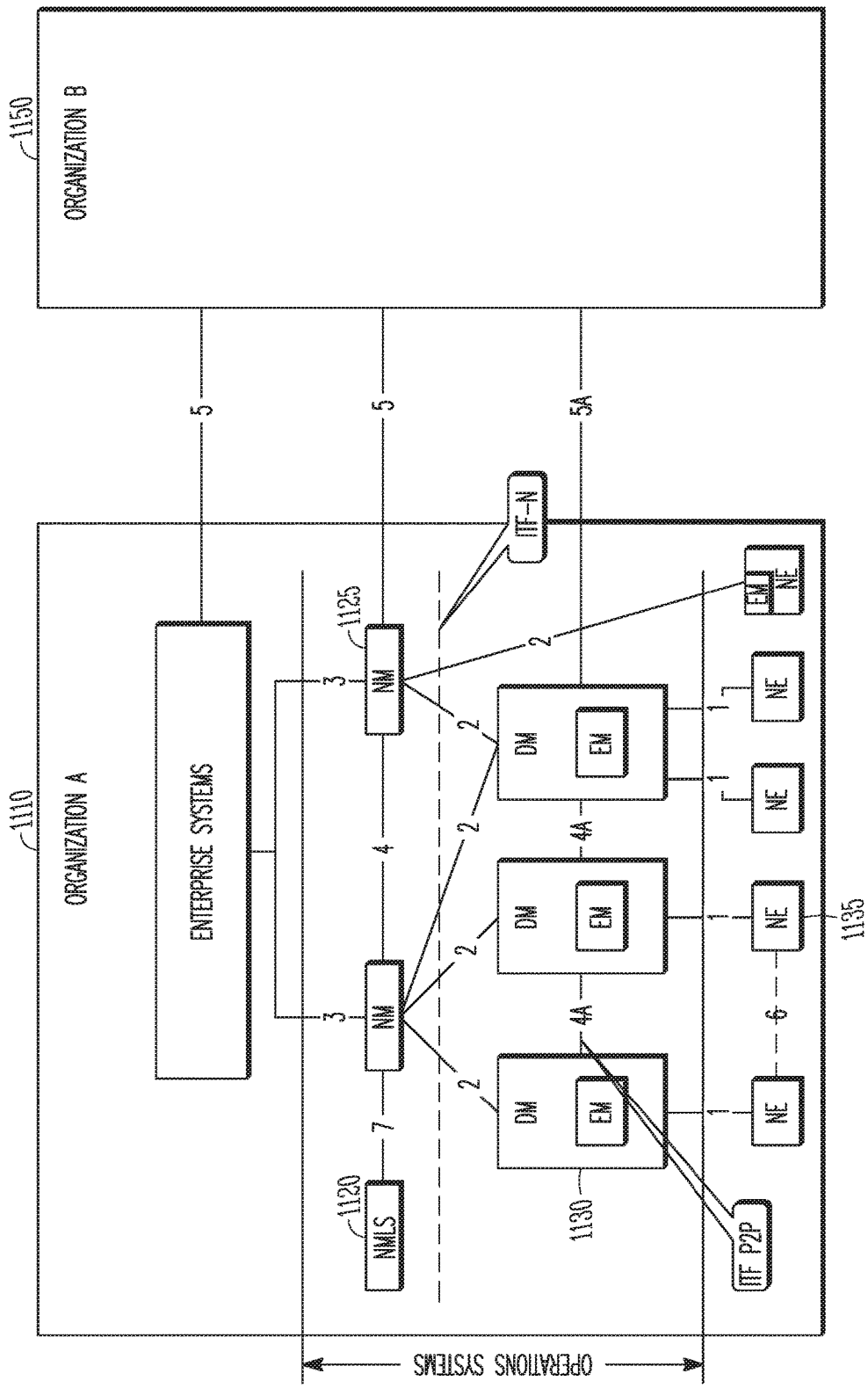
FIG. 11 illustrates an example of a Third Generation Partnership Project (3GPP) network management architecture in accordance with some embodiments.

FIG. 11 illustrates an example of a Third Generation Partnership Project (3GPP) network management architecture in accordance with some embodiments. As shown in FIG. 11, the network 1110 (which may be managed by an organization such as a carrier, service provider, company or other) may include various components for network management, such as one or more Network Management Layer Service (NMLS) 1120, Network Managers (NM) 1125, Domain Managers (DM) 1130, Network Elements (NE) 1135 and/or others. The components may be communicatively coupled over various interfaces, including but not limited to those shown in FIG. 11. In some embodiments, components may be communicatively coupled to components in a second network 1150 over various interfaces, including but not limited to those shown in FIG. 11. As an example, the second network 1150 may be managed by a different organization (such as a different carrier, service provider, company or other) than the organization that manages the first network 1110.

In some embodiments, the Network Manager (NM) may provide a package of end-user functions with the responsibility for the management of a network, mainly as supported by the EM(s) but it may also involve direct access to the Network Elements (NE). Some or all communication with the network may be based on open and well-standardized interfaces supporting management of multi-vendor and multi-technology Network Elements, in some cases. The Domain Manager (DM) may provide element management functions and domain management functions for a sub-network, in some embodiments. Inter-working domain managers may provide multi-vendor and multi-technology network management functions. In some embodiments, an Element Manager (EM) may provide a package of end-user functions for management of a set of closely related types of network elements. These functions can be divided into two main categories: Element Management Functions and Sub-Network Management Functions. A Network Element (NE) may correspond to a discrete telecommunications entity, which can be managed over a specific interface, such as the RNC or other suitable interface.

In some embodiments, the LSA repository 535 and the LSA controller 540 may be integrated into a 3GPP network, such as the example network 1100 shown in FIG. 11, examples of which will be presented below. FIGS. 12-17 illustrate other examples of 3GPP network architectures in accordance with some embodiments. Although the example networks shown in FIGS. 11-17 may illustrate some or all concepts and/or techniques described herein, embodiments are not limited to the example networks shown in FIGS. 11-17 in terms of number, type and/or arrangement of components. In addition, embodiments are also not limited to 3GPP networks, as spectrum sharing network components, such as the LSA repository 535 and the LSA controller 540 (and SAS repository and SAS controller) may be integrated into other types of networks, in some cases.

Figure 12:
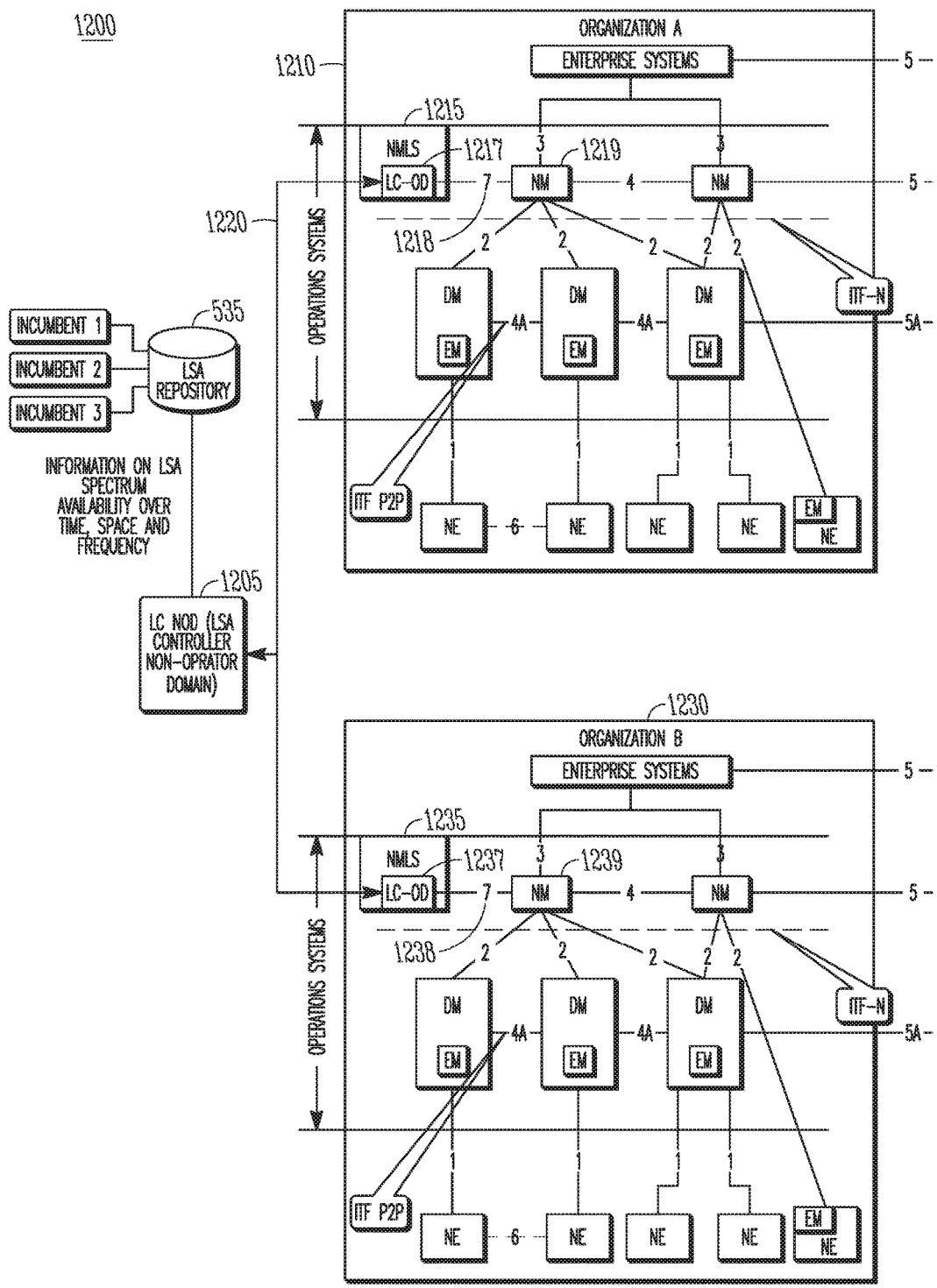
FIG. 12 illustrates another example of a 3GPP network architecture in accordance with some embodiments.

Referring to the example arrangement of FIG. 12, the LSA Controller 540 may be divided into an LC-OD and LC-NOD in accordance with a 3GPP network. In the example shown in FIG. 12, in the presence of several operators, an LSA Controller 540 may be separated to include an "operator domain" controller (LC-OD) 1217 within the NMLS 1215 as part of the network 1210 of "Organization A." The LC-OD 1217 may operate in accordance with the "non-operator domain" controller LC-NOD 1205, which may be communicatively coupled to the LSA Repository 535. In addition, the LC-OD 1237 within the NMLS 1235 as part of the network 1230 of "Organization B" may operate in accordance with the LC-NOD 1205. In some cases, the interface 1220 (which may be an additional interface not necessarily included in some 3GPP arrangements such as that shown in FIG. 11) may connect the LC-NOD 1205 and LC-OD 1217 (through to OA&M) in some cases. The interface may also connect the LC-NOD 1205 to the LC-OD 1237 (through to OA&M) in some cases. Some or all operator critical information may be managed within the LC-ODs 1217, 1237 while generic, public, non-critical and/or non-confidential information may be available in the LC-NOD 1205. As shown in FIG. 12, in some embodiments, the LC-OD 1237 in NMLS 1235 may connect to NM 1239 via the Type-7 interface 1238. In addition, in some embodiments, the LC-OD 1217 in NMLS 1215 may connect to NM 1219 via the Type-7 interface 1218. Accordingly, in these and other embodiments, a type-7 interface may connect an LC with an NM.

Figure 13:
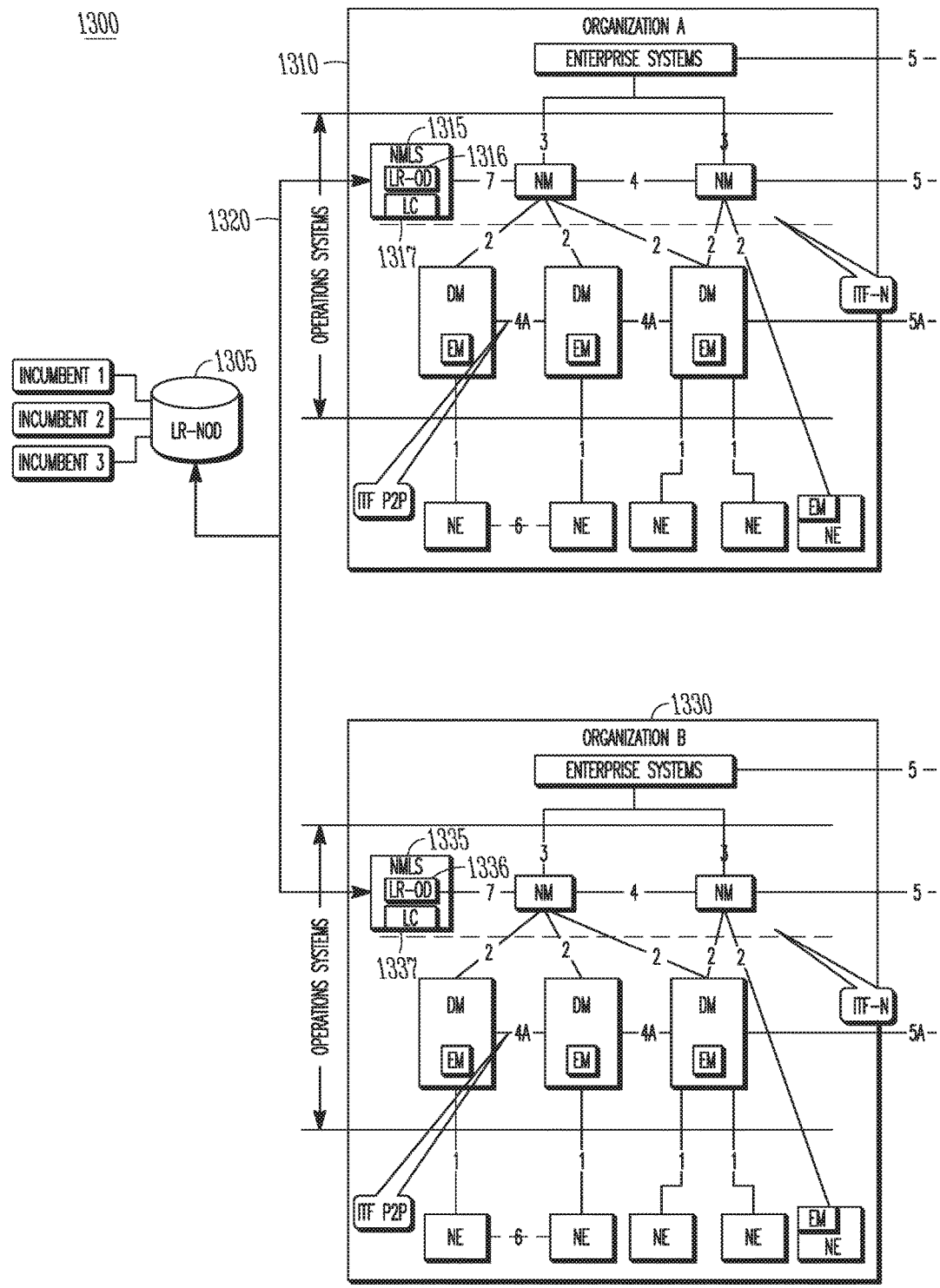
FIG. 13 illustrates another example of a 3GPP network architecture in accordance with some embodiments.

Referring to the example arrangement of FIG. 13, an LSA Repository 535 may be divided into an LR-OD and LR-NOD in accordance with a 3GPP network. In the presence of several operators, an LSA Repository 535 may be separated to include an "operator domain" repository (LR-OD) 1316 within an NMLS 1315 of a network 1310 of "Organization A." The LR-OD 1316 may operate in accordance with a "non-operator domain" repository (LR-NOD) 1305. The NMLS 1315 may also include the LC 1317. In some cases, an interface 1320 (which may be an additional interface not necessarily included in some 3GPP arrangements such as that shown in FIG. 11) may connect the LR-NOD 1305 and the LR-OD 1316/LC 1317 (through to OA&M). Some or all operator critical information may be managed within the LR-OD 1316 while generic, public, non-critical and/or non-confidential information may be available in the LR-NOD 1305. In addition, a similar arrangement may be used in the network 1330 of "Organization B."

Figure 14:
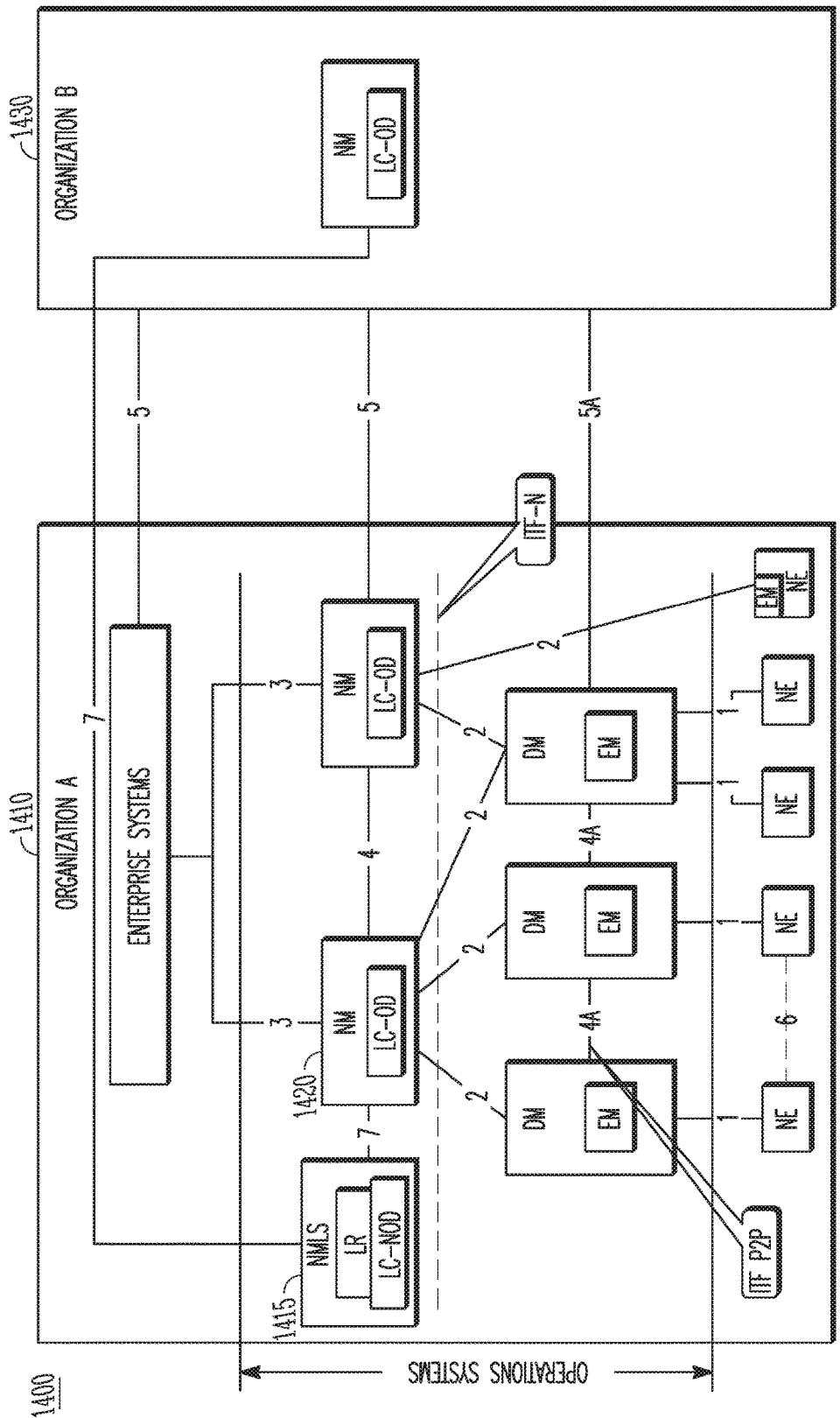
FIG. 14 illustrates another example of a 3GPP network architecture in accordance with some embodiments.

Referring to the example arrangement of FIG. 14, as part of the network 1410 of "Organization A," the NMLS 1415 may support and/or include an LR and LC-NOD (or SAS-R (SAS Repository) and SAS-C NOD (SAS Controller Non-Operator-Domain), respectively, in the SAS case). In addition, one or more NMs 1420 may support and/or include the LC-OD (SAS-C OD (SAS Controller Operator-Domain) in the SAS case). In some embodiments, the LR and LC-NOD (SAS-R and SAS-C NOD in the SAS case) may interact with the NMs of multiple distinct operators through the applicable interfaces (such as interface 7). As an example, the interface 7 may be standardized in a manner in which an LR may control multiple LCs that are located in an organization or in different organizations.

Figure 15:
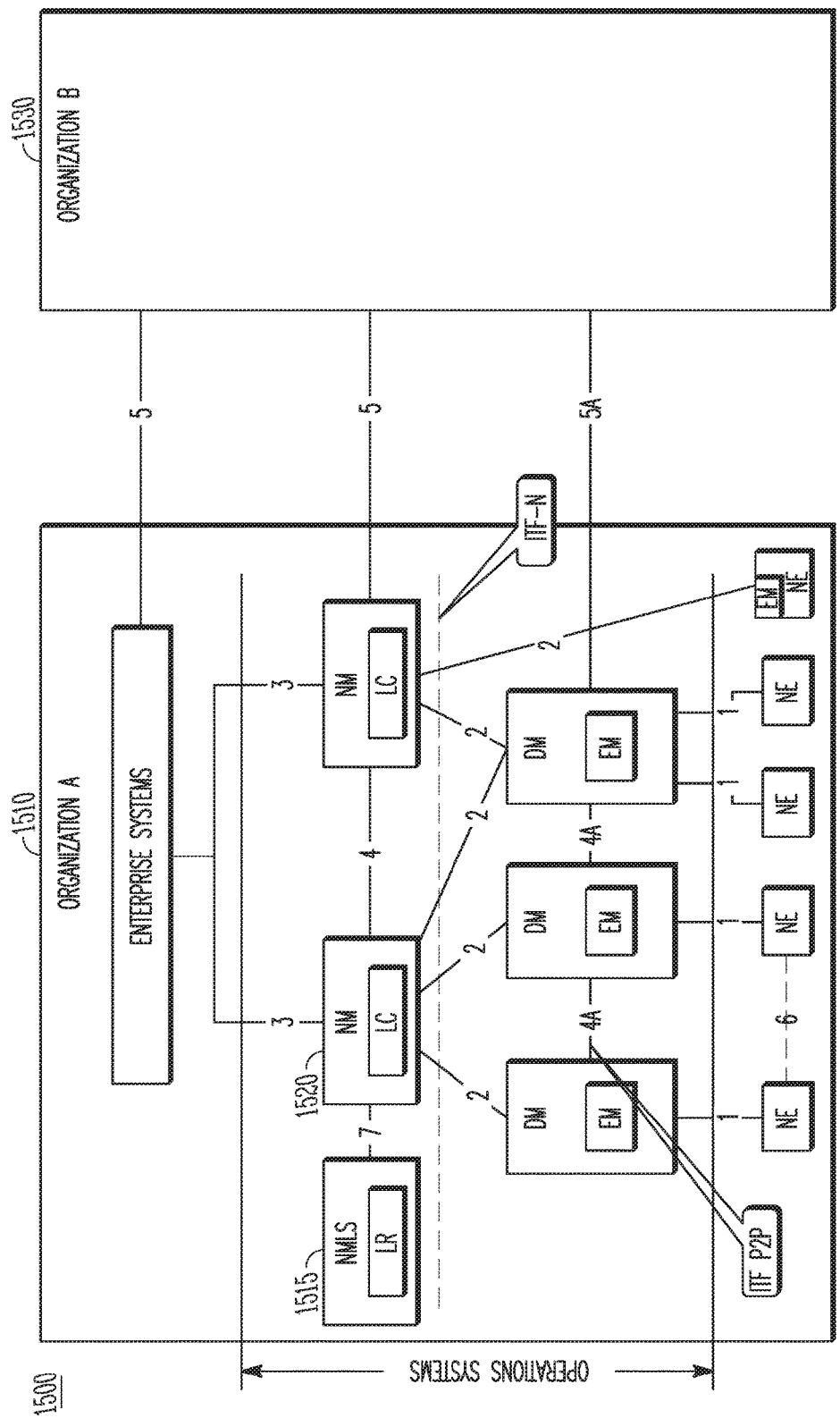
FIG. 15 illustrates another example of a 3GPP network architecture in accordance with some embodiments.

Referring to the example arrangement of FIG. 15, the LR 535 may be supported by and/or included in the NMLS 1515 of network 1510 of "Organization A" and the LC 540 may be supported by and/or included in one or more NMs 1520 of the network 1510. In some embodiments, some or all high level functions between LC 540 and LR 535 may remain unchanged. A functionality split between an LR-OD and LR-NOD may be implementation dependent, as it is may depend on a level of confidentiality of information to be stored and processed through the LR. For example, internal MNO configuration parameters may be kept in an LR-OD as well as some or all data storage, protection requirements and management functions. On the other hand, derivation of spectrum availability may be kept in an LR-NOD.

Figure 16:
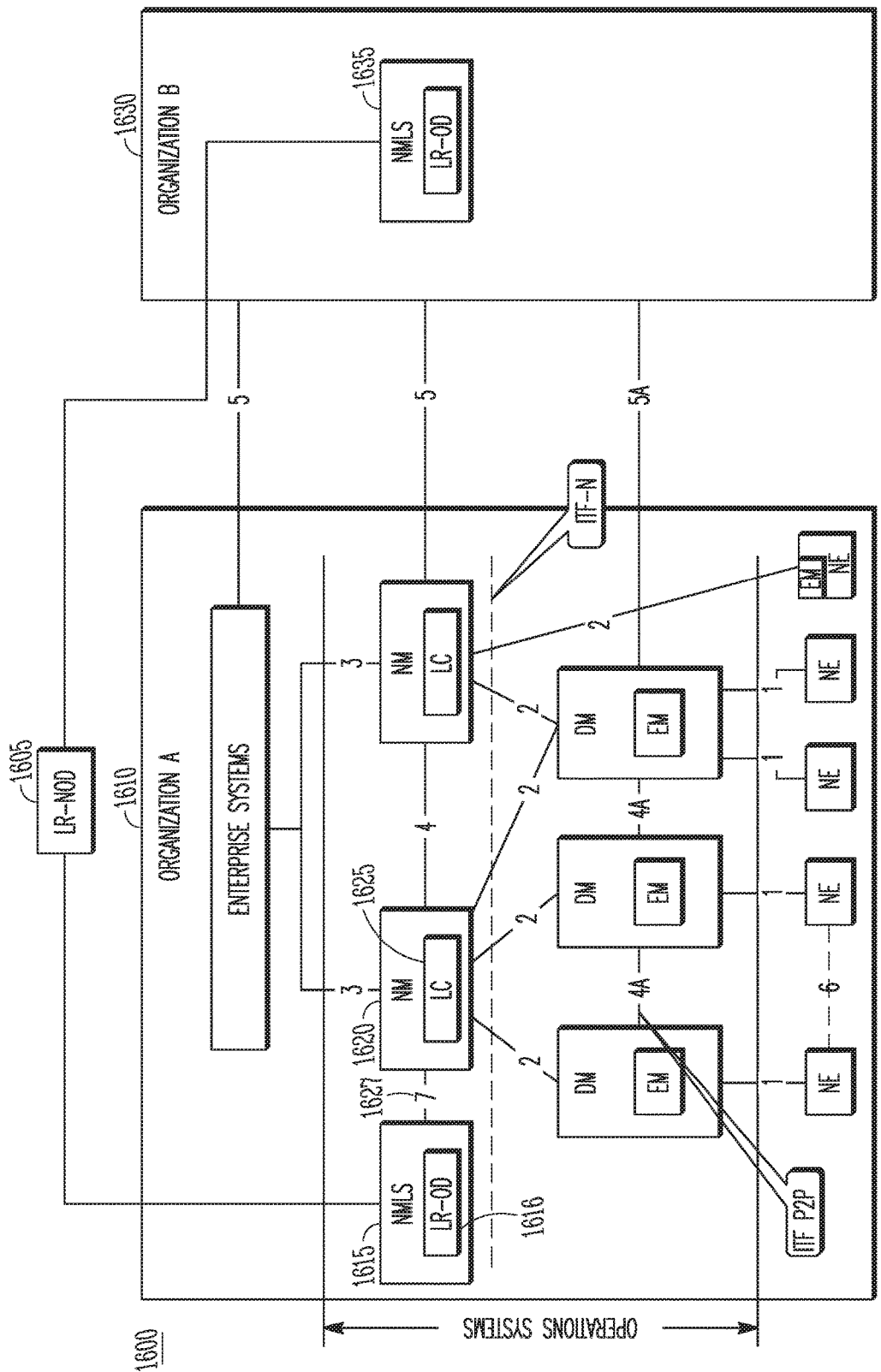
FIG. 16 illustrates another example of a 3GPP network architecture in accordance with some embodiments.

Referring to the example arrangement of FIG. 16, an LR 535 may be split into an LR-NOD 1605 and LR-OD 1616 (included in and/or supported by the NMLS 1615), in which the NMLS 1615 is included as part of the network 1610 of "Organization A." The LC 1625 may be included in and/or supported by one or more NMs 1620. In some embodiments, the LC 1625 may be communicatively coupled to the LR-OD 1616 via the "interface 7" 1627.

An example scenario, which may be related to FIGS. 15 and 16 in some cases, is described below. An LC may be allocated to the NM entity and called "NM SC," an LR may be allocated to the NMLS entity and called "NMLS SP." In the example scenario, an incumbent may be able to reclaim spectrum in a given area and for a given time period, according to the sharing agreement. The scenario may include operations performed by an incumbent (incumbent spectrum holder), an NMLS SP (Service Producer) such as an LSA Repository, an NM SC (Service Consumer) such as an LSA controller, and an access network (such as an LTE network. It may be assumed that the Sharing Agreement between the Incumbent and LSA Licensee includes mechanisms enabling the Incumbent to reclaim spectrum at short notice under agreed conditions. An Incumbent may decide to reclaim spectrum in a given area and for a given time period. The Incumbent may provide the NMLS SP a trigger to the LR detailing the conditions under which the spectrum is reclaimed (such as a concerned geographic area, concerned duration of spectrum unavailability to LSA licensee and/or other conditions).

The NMLS SP may forward the trigger to the NM SC. Based on the geographic area provided by the NMPS SP, the NM SC may identify the access networks which are using the spectrum to be reclaimed. The NM SC may ask the access networks to discontinue using the concerned spectrum under the conditions provided by the incumbent. After some or all access networks stop using the spectrum, the NM SC may send an acknowledgement to the NMLS SP to indicate that the spectrum has been reclaimed. After expiration of the duration of spectrum unavailability to LSA licensee, the LC(s) may identify concerned LSA licensees (NM entities) and may provide a trigger indicating that the spectrum is again available to concerned LSA licensees.

Alternatively, the Incumbent may provide a trigger to the concerned LC(s). The concerned LC(s) may identify the concerned LSA licensees (NM entities) and may provide the corresponding trigger indicating that the spectrum is again available for usage. Following an interruption of spectrum availability to LSA licensees, the spectrum may be available again for continued usage by LSA licensees.

It should be noted that the terms "NOD" (Non Operator Domain) and OD (Operator Domain) may be used herein, typically in conjunction with LR (LSA Repository), LC (LSA Controller), SAS-R (SAS Repository) and SAS-C (SAS Controller). Instead of "NOD" and "OD", the following alternative wording may be used herein: "NLD" (Non Licensee Domain) instead of NOD, "LD" (Licensee Domain) instead of OD, "NLLD" (Non LSA Licensee Domain) instead of NOD, "LLD" (LSA Licensee Domain) instead of OD, "NSOD" (Non Spectrum Owner Domain) instead of NOD, "SOD" (Spectrum Owner Domain) instead of OD, "NPALD" (Non PAL (Priority Access License) Domain) instead of NOD, "PALD" (PAL (Priority Access License) Domain) instead of OD, "NCBSDD" (Non CBSD Domain) instead of NOD, "CBSDD" (CBSD Domain) instead of OD, "NCD" (Non CBSD Domain) instead of NOD, "CD" (CBSD Domain) instead of OD. Furthermore, other terms may be generalized and allocated to 3GPP SA5 components. The "LC" may be allocated to the NM entity and called "NM SC", the "LR" may be allocated to the NMLS entity and called "NMLS SP". Optionally, the LC may be split into LC-OD/NOD and allocated to the NMLS (LC-NOD) and NM (LC-OD). Yet another alternative is to split the LR into LR-OD/NOD and allocate it to the NMLS (LR-NOD) and NM (LR-OD). Then, the NM SC may comprise all LSA/SAS elements allocated to the NM and the NMLS SP may comprise all LSA/SAS elements allocated to the NMLS.

Figure 17:
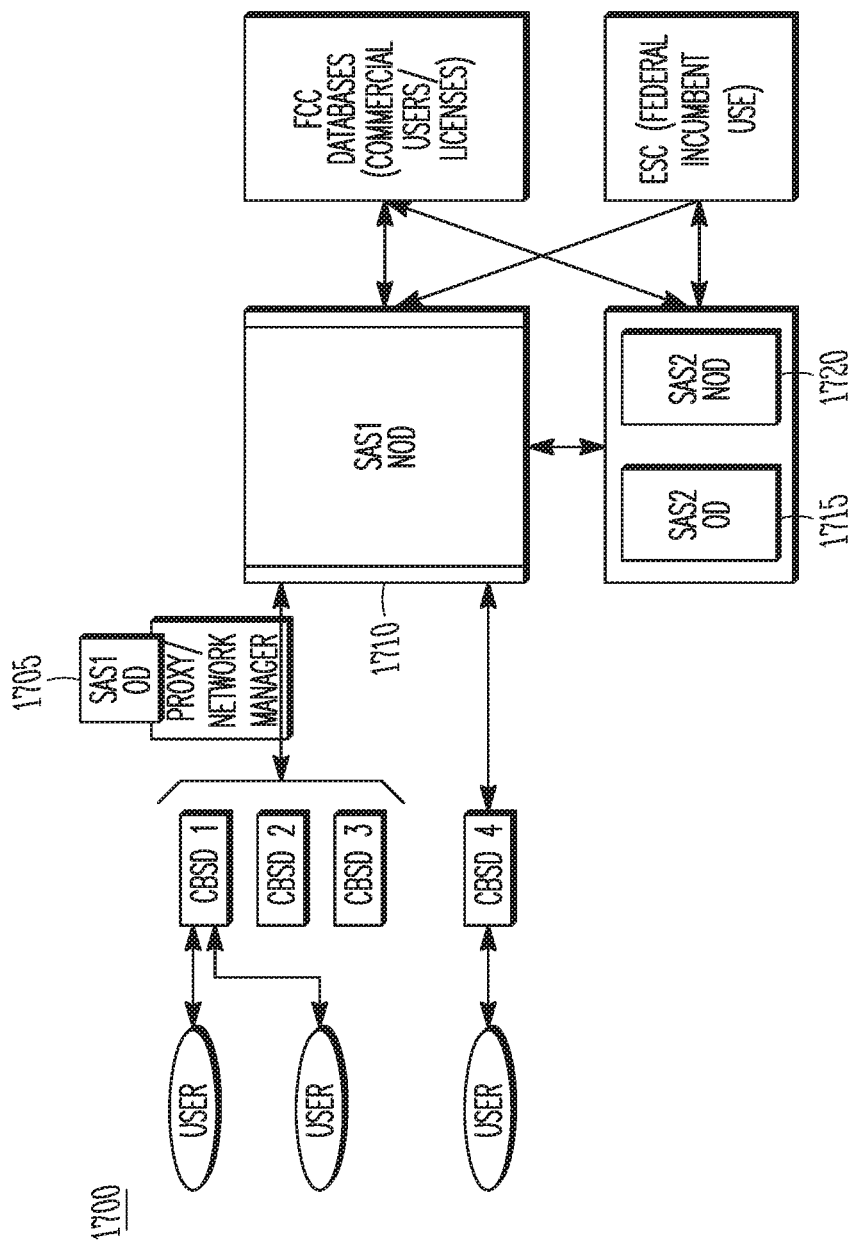
FIG. 17 illustrates another example of a 3GPP network architecture in accordance with some embodiments.

It should be noted that embodiments are not limited to LSA techniques, as SAS techniques may be used in some cases. As an example, an SAS Repository may be split into a SAS-R-NOD and SAS-R-OD in a similar arrangement. Referring to FIG. 17, an example of splitting functionality of SAS components between an operator domain and a non-operator domain is shown. In the SAS case, a SAS entity (such as 570 or 572 of FIG. 5) may comprise an SAS-C(SAS Controller) and optionally an SAS-R (SAS Repository). As an alternative, the repository may be fully contained in the FCC Database 575 of FIG. 5 in some embodiments. Also, it is possible that the SAS-R may be split between the FCC Database 575 and the SAS entities 570, 572 (similar to the "OD" and "NOD" domain). In the latter case, it is also possible that the SAS-R may be split into 3 parts: the SAS-R-FCC or SAS-R-ESC (SAS Repository FCC or ESC Domain) which is controlled by the FCC or ESC 580 (or a certified $3^{rd}$ party), the SAS-R-SAS (SAS Repository within a SAS component) and SAS-R-OD (SAS Repository within the LSA Licensee (Operator) Domain). Furthermore, it is possible that the SAS components may be split into a SAS-OD (SAS Operator Domain) and SAS-NOD. In some embodiments, the internal separation between SAS-OD and SAS-NOD may be on the Controller Level. As an example, the SAS-R may be in the NOD domain, the SAS-C-NOD may be in the NOD domain and the SAS-C-OD may be in the OD domain with an interface between the SAS-C-NOD and the SAS-C-OD). In some embodiments, the internal separation may be on the Repository Level. As an example, the SAS-C may be in the OD domain, the SAS-R-NOD may be in the NOD domain and the SAS-R-OD may be in the OD domain with an interface between the SAS-R-NOD and the SAS-R-OD). In some embodiments, the OD part may be placed into the "Proxy/Network Manager" component for all or some LSA Licensees (Operators) or into the concerned CBSDs' of the concerned LSA Licensee directly. Furthermore, it is also possible that the SAS-R may be split into 4 parts: the SAS-R-FCC (SAS Repository FCC Domain) which is controlled by the FCC (or a certified 3rd party), the SAS-R-ESC (controlled by the ESC), the SAS-R-SAS (SAS Repository within a SAS component) and SAS-R-OD (SAS Repository within the LSA Licensee (Operator) Domain).

Figure 18:
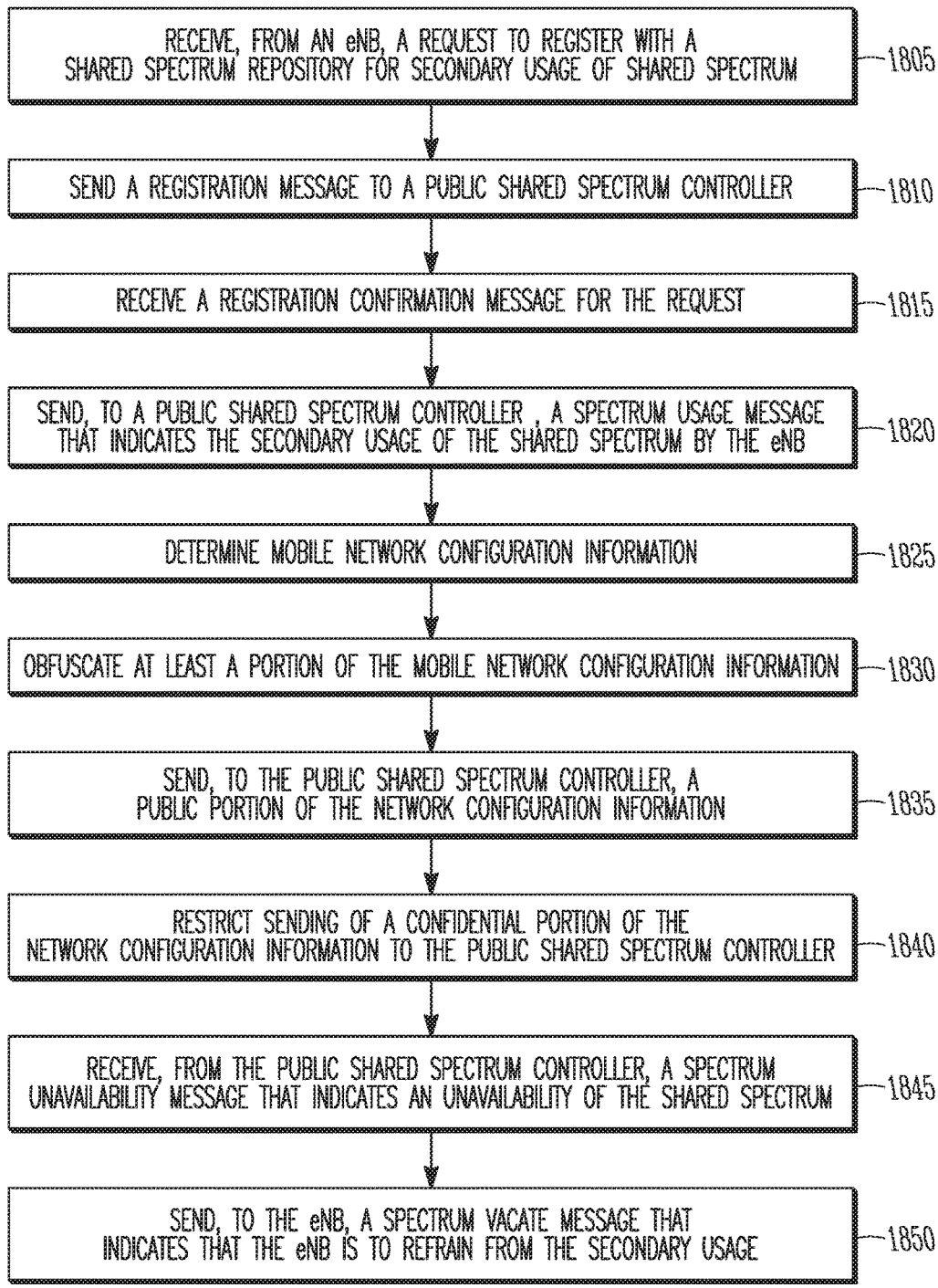
FIG. 18 illustrates the operation of a method of communication in shared spectrum in accordance with some embodiments.
Figure 19:
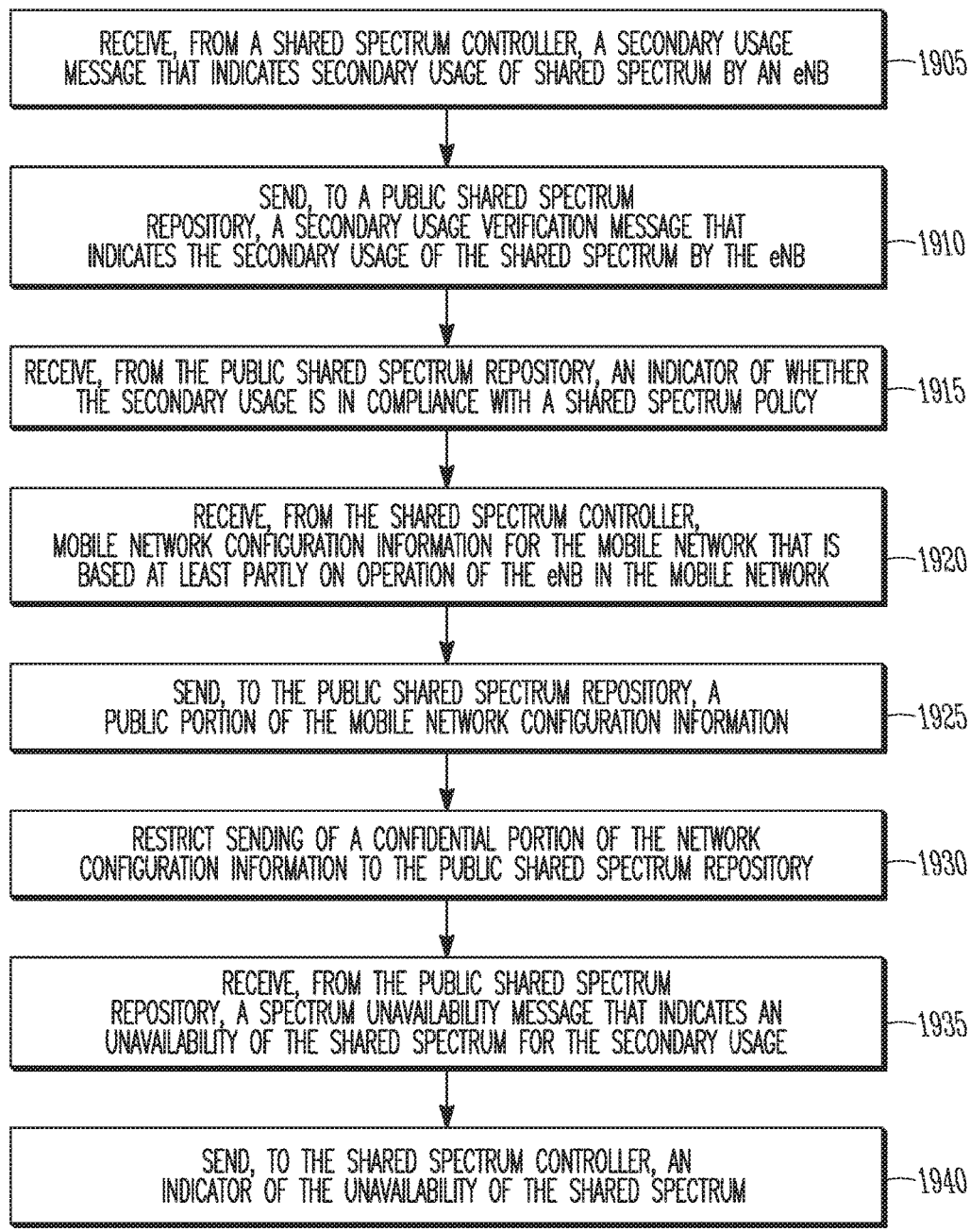
FIG. 19 illustrates the operation of another method of communication in shared spectrum in accordance with some embodiments.
Figure 20:
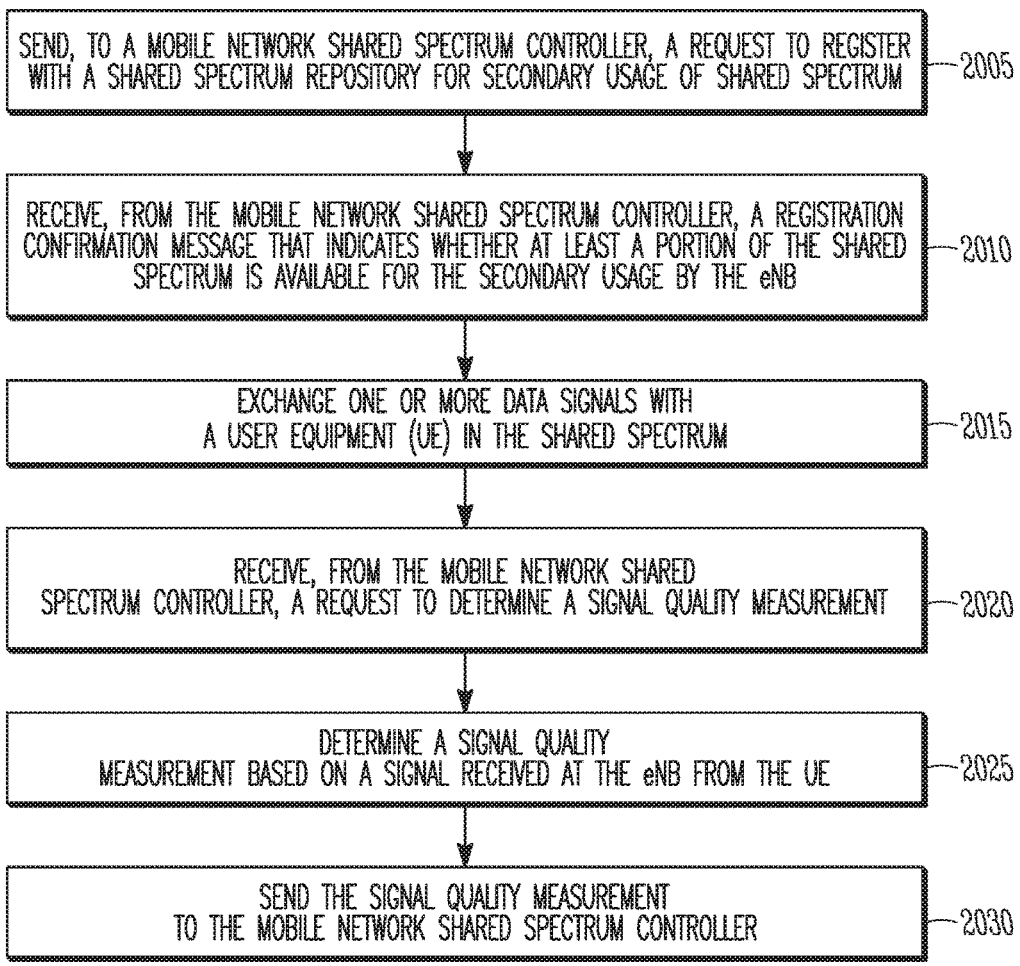
FIG. 20 illustrates the operation of another method of communication in shared spectrum in accordance with some embodiments.

FIG. 18 illustrates the operation of a method of communication using shared spectrum in accordance with some embodiments. FIG. 19 illustrates the operation of another method of communication using shared spectrum in accordance with some embodiments. FIG. 20 illustrates the operation of another method of communication using shared spectrum in accordance with some embodiments. It is important to note that embodiments of the methods 1800-2000 may include additional or even fewer operations or processes in comparison to what is illustrated in FIGS. 18-20. In addition, embodiments of the methods 1800-2000 are not necessarily limited to the chronological order that is shown in FIGS. 18-20. In describing the methods 1800-2000, reference may be made to one or more of FIGS. 1-20, although it is understood that the methods 1800-2000 may be practiced with any other suitable systems, interfaces and components.

In addition, while the methods 1800-2000 and other methods described herein may refer to eNBs 104 or UEs 102 operating in accordance with 3GPP or other standards, embodiments of those methods are not limited to just those eNBs 104 or UEs 102 and may also use other devices, such as a CSBD, Wi-Fi access point (AP) or user station (STA). In addition, the methods 1800-2000 and other methods described herein may be practiced by wireless devices configured to operate in other suitable types of wireless communication systems, including systems configured to operate according to various IEEE standards such as IEEE 802.11. In some embodiments, a CBSD may be included as a base station component. It should be noted that the CBSD may be an eNB 104 and/or may be configured to operate as an eNB 104 in some cases.

It should be noted that although operations and/or techniques may be described in terms of LSA components (such as an LSA Controller and/or LSA Repository) or SAS components (such as an SAS Controller and/or SAS Repository), it is understood that embodiments are not limited to LSA spectrum sharing techniques or to SAS spectrum sharing techniques, and some embodiments may be applicable to other spectrum sharing techniques.

It should be noted that although operations and/or techniques may be described in terms of an eNB 300 (from FIG. 3), it is understood that embodiments may include any suitable network, including but not limited to those shown in FIGS. 1-17 and those described herein. Embodiments are also not limited to the eNB 300, as other base station components may be used, in some cases.

In some cases, operations described as part of one of the methods 1800-2000 may be relevant to, similar to and/or reciprocal to operations of another of the methods 1800-2000. For instance, an operation of the method 1800 may include transmission of a message by a first component to a second component, and an operation of the method 1900 may include reception of the same message or similar message by the second component from the first component.

It should be noted that the method 1800 may be practiced by a mobile network shared spectrum controller and/or by an apparatus for such a device, in some embodiments. The method 1900 may be practiced by a mobile network shared spectrum repository and/or by an apparatus for such a device, in some embodiments. The method 2000 may be practiced by an eNB, a base station and/or an apparatus for an eNB and/or base station, in some embodiments. However, these embodiments are not limiting, as the methods 1800-2000 may be practiced by other components, in some embodiments.

In addition, some embodiments may include one or more operations of any or all of methods 1800-2000 and some embodiments may include additional operations. As an example, operations related to descriptions herein of FIGS. 9-17 may be included in some embodiments. Accordingly, in some embodiments, a shared spectrum controller, a shared spectrum repository, one or more portions of a shared spectrum controller and/or one or more portions of a shared spectrum repository may be included as part of a mobile network (such as a 3GPP network or other network) in arrangements including, but not limited to, those shown in FIGS. 9-17.

Some components may be included in, may be internal to and/or may operate as part of a mobile network domain, in some embodiments. As an example, components such as a mobile network shared spectrum controller, a mobile network shared spectrum repository and/or others may operate as part of a mobile network domain. As another example, components such as a public shared spectrum controller, a public shared spectrum repository and/or others may operate outside of a mobile network domain. In some embodiments, the public shared spectrum controller may be operated by a third party, such as a government entity or other entity.

In some embodiments, a managing entity of the mobile network domain may control (at least to some extent) operations performed by components of the mobile network domain (such as the mobile network shared spectrum controller in the method 1800) and/or may control access to information by those components. Such control of operations and/or information by the managing entity may be restricted or non-existent for components outside of the mobile network domain (such as the public shared spectrum controller and/or shared spectrum repository in the method 1800), in some cases. Embodiments are not limited to usage of such a managing entity for controlling the operations and/or information access by components included in the mobile network domain, however. For instance, such operations and/or information access may be related to a standard and/or an implementation, in some cases.

As a non-limiting example, a "mobile network shared spectrum controller" may be, may include and/or may be included as part of an LC-OD (operator domain LSA controller). In some embodiments, the mobile network shared spectrum controller may operate as part of a Network Management Layer Service (NMLS) of a 3GPP network. As another non-limiting example, a "public shared spectrum controller" may be, may include and/or may be included as part of an LC-NOD (non-operator domain LSA controller). In some embodiments, the mobile network shared spectrum controller may be configured to operate with the public shared spectrum controller as part of an LSA controller that manages the secondary usage of the shared spectrum. Embodiments are not limited to LSA techniques, however, as the mobile network shared spectrum controller may be configured to operate with the public shared spectrum controller as part of a SAS controller that manages the secondary usage of the shared spectrum, in some embodiments.

As another non-limiting example, a "mobile network shared spectrum repository" may be, may include and/or may be included as part of an LR-OD (operator domain LSA repository). As another non-limiting example, a "public shared spectrum repository" may be, may include and/or may be included as part of an LR-NOD (non-operator domain LSA repository). In some embodiments, the mobile network shared spectrum repository may be configured to operate with the public shared spectrum repository as part of an LSA repository. In some embodiments, the mobile network shared spectrum repository may operate as part of a Network Management Layer Service (NMLS) of a 3GPP network. Embodiments are not limited to LSA techniques, however, as the mobile network shared spectrum repository may be configured to operate with the public shared spectrum repository as part of an SAS repository, in some embodiments.

These examples are not limiting, however, as other shared spectrum controllers and/or shared spectrum repositories (such as those related to SAS) may be used in some embodiments.

In some embodiments of the methods 1800, 1900, 2000 and/or others, a macro cell eNB, femto cell eNB, pico cell eNB or small cell eNB may be used. As an example, the method 2000 may be practiced by a macro cell eNB, femto cell eNB, pico cell eNB or small cell eNB in some embodiments. Embodiments may also be applicable to an eNB 300 that may be arranged to operate as a macro cell eNB, femto cell eNB, pico cell eNB or small cell eNB.

In some embodiments, techniques described herein may be applicable to a stand-alone version of spectrum sharing (LSA, SAS and/or other). In such arrangements, a base station may not necessarily be under the control of an operator but may be operated independently by a user. For instance, a base station that may be or may be similar to a WiFi Access Point may be used in such a stand-alone arrangement.

It should be noted that in some embodiments, LSA or other spectrum sharing techniques may be used, and an operator may maintain a network based on dedicated licensed spectrum in parallel to the usage of the shared spectrum. However, in some embodiments, a home user may be able to deploy its own LSA/SAS network as a stand-alone solution, and some or all techniques described herein may be applicable in some cases. For instance, such arrangements may be implemented in a 3.5 GHz band (and/or other suitable frequency band) in accordance with a standard such as that developed by the MuLTEfire alliance or other alliance.

At operation 1805 of the method 1800, the mobile network shared spectrum controller may receive, from an eNB 300 of the mobile network domain, a request to register with a shared spectrum repository for secondary usage of shared spectrum. In some embodiments, the shared spectrum may be reserved for primary usage by one or more incumbent devices. As an example, a shard spectrum repository may manage, approve, facilitate and/or coordinate the secondary usage and the primary usage, in some cases.

At operation 1810, the mobile network shared spectrum controller may send a registration message to a public shared spectrum controller. In some embodiments, the public shared spectrum controller may be external to the mobile network domain. As an example, the registration message may be sent to the public shared spectrum controller for forwarding to the shared spectrum repository.

As an example, the registration message may indicate that the eNB 300 has requested to register with the shared spectrum repository and/or other related information. Embodiments are not limited to forwarding of the exact contents of the request received from the eNB 300 at operation 1805. For instance, the registration message may be based at least partly on an identity of the eNB 300 that is obfuscated to enable a confidentiality of mobile network configuration information within the mobile network domain, in some cases. The registration message and/or other messages may include information (such as information about the eNB 300 and/or the network) that may be sent as anonymous, public, non-confidential or similar requests, in some cases, which may depend on a level of confidentiality for the network At operation 1815, the mobile network shared spectrum controller may receive, from the public shared spectrum controller, a registration confirmation message for the request of operation 1810. In some embodiments, the registration confirmation message may be received from the public shared spectrum controller on behalf of the shared spectrum repository. The registration confirmation message may be based at least partly on the obfuscated identity of the eNB 300, in some cases.

At operation 1820, the mobile network shared spectrum controller may send, to the public shared spectrum controller, a spectrum usage message that indicates the secondary usage of the shared spectrum by the eNB 300. In some embodiments, the spectrum usage message may be sent to the public shared spectrum controller for forwarding to the shared spectrum repository. In some cases, the spectrum usage message may be based at least partly on the obfuscated identity of the eNB 300.

At operation 1825, the mobile network shared spectrum controller may determine mobile network configuration information. As an example, such information may be based on secondary usage of the shared spectrum by a group of one or more eNBs 300 of the mobile network domain. For instance, deployment of the eNBs 300, usage by mobile devices, signal quality measurements, network performance statistics and/or other information may be determined. In some cases, such information may be received at the mobile network shared spectrum controller from another component (such as an eNB 300 or other).

At operation 1830, at least a portion of the mobile network configuration information may be obfuscated by the mobile network shared spectrum controller. For instance, an identity of the eNB 300 may be obfuscated to components outside of the mobile network domain. Such obfuscation may enable maintenance of confidential information (such as network configuration information) within the mobile network domain. In some embodiments, the mobile network shared spectrum controller may send, to the public shared spectrum controller and/or other component, network configuration information that may be anonymous, public, non-confidential, obfuscated and/or similar.

At operation 1835, the mobile network shared spectrum controller may send, to the public shared spectrum controller, a public portion of the network configuration information. In some embodiments, the public portion may be sent to the public shared spectrum controller for forwarding to the shared spectrum repository. At operation 1840, the mobile network shared spectrum controller may restrict sending, to the public shared spectrum controller, of a confidential portion of the network configuration information. Accordingly, the restriction of the sending of the confidential portion may enable maintenance of confidential information (such as network configuration information) within the mobile network domain. As an example, the confidential portion may include signal quality measurements at one or more of the eNBs 300 and the public portion may include a combined signal quality measurement (such as an average), which may obfuscate individual measurements.

At operation 1845, the mobile network shared spectrum controller may receive, from the public shared spectrum controller, a spectrum unavailability message. In some embodiments, the spectrum unavailability message may indicate an unavailability of the shared spectrum for the secondary usage and/or other related information. The spectrum unavailability message may be received from the public shared spectrum controller on behalf of the shared spectrum repository, in some cases. As an example, the spectrum unavailability message may be based on the obfuscated identity of the eNB 300, in some cases.

At operation 1850, the mobile network shared spectrum controller may send, to the eNB 300, a spectrum vacate message that indicates that the eNB is to refrain from the secondary usage. In some embodiments, the exchanging of the spectrum unavailability message and the spectrum vacate message (and/or similar messages) may be part of a reclaiming of the shared spectrum by an incumbent device.

As an example, the availability of the shared spectrum for the secondary usage may be restricted to inactivity periods of one or more incumbent devices. As another example, an availability of the shared spectrum for the secondary usage may be based at least partly on an inactivity condition of the incumbent devices. As another example, an unavailability of the shared spectrum for the secondary usage may be based at least partly on an activity condition of the incumbent devices. As another example, the availability may be based at least partly on one or more scheduled periods of inactivity for the incumbent devices in the shared spectrum. As another example, the inactivity condition may be related to a predetermined threshold of activity and/or interference. For instance, the inactivity condition may occur when a level of interference to an incumbent is below the threshold. As another example, the inactivity condition may be limited to a geographic area. For instance, the geographic area may include a zone, such as an Exclusion, Restriction, Protection zone or other zone.

Referring to the method 1900 shown in FIG. 19, at operation 1905, the mobile network shared spectrum repository may receive, from a shared spectrum controller, a secondary usage message that indicates secondary usage of shared spectrum by an eNB 300. In some embodiments, the mobile network shared spectrum repository may operate as part of a Network Management Layer Service (NMLS) of a 3GPP network. As a non-limiting example, messages (such as the secondary usage message and/or others) may be exchanged with the mobile network shared spectrum controller over a Type-7 interface of the 3GPP network. This example is not limiting, however, as other interfaces may be used in some cases.

At operation 1910, the mobile network shared spectrum repository may send, to a public shared spectrum repository, a secondary usage verification message that indicates the secondary usage of the shared spectrum by the eNB 300. In some embodiments, an identity of the eNB 300 may be obfuscated in the secondary usage verification message. As described earlier, such an obfuscation may enable maintenance of confidential information within the mobile network domain, in some cases. At operation 1915, the mobile network shared spectrum repository may receive, from the public shared spectrum repository, an indicator of whether the secondary usage is in compliance with a shared spectrum policy.

At operation 1920, the mobile network shared spectrum repository may receive, from the shared spectrum controller, mobile network configuration information for the mobile network that is based at least partly on operation of the eNB 300 in the mobile network. Although not limited as such, the mobile network configuration information may similar to that described regarding the method 1800. In some embodiments, the mobile network shared spectrum repository may send, to the public shared spectrum repository and/or other component, network configuration information that may be anonymous, public, non-confidential, obfuscated and/or similar.

At operation 1925, the mobile network shared spectrum repository may send, to the public shared spectrum repository, a public portion of the mobile network configuration information. At operation 1930, the mobile network shared spectrum repository may restrict sending of a confidential portion of the network configuration information to the public shared spectrum repository. As described earlier, such a restriction may enable maintenance of confidential information within the mobile network domain, in some cases.

At operation 1935, the mobile network shared spectrum repository may receive, from the public shared spectrum repository, a spectrum unavailability message that may indicate an unavailability of the shared spectrum for the secondary usage. At operation 1940, the mobile network shared spectrum repository may send, to the shared spectrum controller, an indicator of the unavailability of the shared spectrum. Although not limited as such, operations 1935 and/or 1940 may be related to a reclaiming of the shared spectrum by an incumbent device, in some cases, as previously described. The unavailability of the shared spectrum may be based on any number of factors, including but not limited to those described regarding the method 1800.

Referring to the method 2000 shown in FIG. 20, at operation 2005, the eNB 300 may send, to a mobile network shared spectrum controller, a request to register with a shared spectrum repository for secondary usage of shared spectrum. As a non-limiting example, the mobile network shared spectrum controller may operate as part of the mobile network domain and the shared spectrum repository may operate externally to the mobile network domain. In some embodiments, the shared spectrum may be at least partly reserved, by the shared spectrum repository, for primary usage by one or more incumbent devices.

At operation 2010, the eNB 300 may receive, from the mobile network shared spectrum controller, a registration confirmation message that indicates whether at least a portion of the shared spectrum is available for the secondary usage by the eNB 300. In some embodiments, the registration confirmation message may be received from the mobile network shared spectrum controller on behalf of a public shared spectrum controller that is excluded from the mobile network domain. The eNB 300 may allocate at least a portion of the shared spectrum to one or more User Equipments (UEs), and may send one or more messages to the UEs to indicate the allocation.

At operation 2015, the eNB 300 may exchange one or more data signals with a UE in the shared spectrum. In some embodiments, the exchanging of the data signals may be performed in accordance with a spectrum sharing policy managed by the shared spectrum repository.

At operation 2020, the eNB 300 may receive, from the mobile network shared spectrum controller, a request to determine a signal quality measurement. In some embodiments, the request may be received from the mobile network shared spectrum controller on behalf of the public shared spectrum controller. Such a request may be performed as part of ensuring that the eNB 300 is operating in compliance with one or more rules, policies, limits and/or other factors.

At operation 2025, the eNB 300 may determine a signal quality measurement. As an example, the measurement may be based on a signal received at the eNB from the UE in the shared spectrum. As another example, the measurement may be based on a signal transmitted by the eNB in the shared spectrum. At operation 2030, the eNB 300 may send the signal quality measurement to the mobile network shared spectrum controller.

In some embodiments, the eNB 300 may be configured to operate in a 3GPP network, and may receive, from a network management (NM) element of the 3GPP network and on behalf of the public shared spectrum controller, spectrum access information and/or spectrum reclaiming information. The spectrum access information may indicate information related to the shared spectrum, including but not limited to a time period and/or a geographic area in which the shared spectrum is to be used in the 3GPP network. The spectrum reclaiming information may indicate information related to the shared spectrum, including but not limited to a time period and/or a geographic area in which the shared spectrum is not to be used in the 3GPP network. Accordingly, based at least partly on the spectrum access information and/or spectrum reclaiming information, the eNB 300 may perform operations such as allocating at least a portion of the shared spectrum to one or more UEs 102, indicating to one or more UEs 102 to vacate at least a portion of the shared spectrum and/or other operations.

In some embodiments, a Network Management (NM) of the 3GPP network may receive spectrum access and/or spectrum reclaiming information from the public shared spectrum controller, and may configure the eNB 300, accordingly, to use the shared spectrum or to refrain from using the shared spectrum. In some embodiments, the eNB 300 may be part of a Network Element (NE) of the 3GPP network, and the configuration of the NE to use or to refrain from using the shared spectrum may be performed at least partly by an Element Manager (EM) of the 3GPP network.

In some embodiments, the eNB 300 may send a trigger and/or message to a UE 102 that may indicate one or more actions that are to be taken by the UE 102, including but not limited to entering, using and/or vacating the shared spectrum. Accordingly, the UE 102 may act upon the trigger and/or message and may perform the indicated action(s). In some cases, it may be mandatory that the UEs 102 perform the action(s) indicated by the trigger and/or message from the eNB 300.

In some embodiments, the LSA/SAS Controller (LC) may be split into operator and non-operator components, LC-OD and LC-NOD respectively. The LC may interact with the LR in order to obtain updated information upon which actions are performed, typically leading to a reconfiguration of the Operator's network. In the classical case, there may be no separation between LC-OD and LC-NOD, so all the processing may be done in a single entity. The concerned LSA licensees (or operators) may be informed about the actions to be implemented (such as to vacate spectrum and/or other action). In some cases, operators may not agree to provide sensitive internal information to an outside entity which is not under the operator's control. In some embodiments described herein, the LC-NOD may receive the information from the LR and may do a pre-processing operation, such as filtering the information targeted to a specific LSA Licensee (or Operator), adapting the information to the interface requirements of the LSA licensee (Operator) and/or other operation. The pre-processed information may be forwarded to the LC-OD and the processing may be finalized there, typically exploiting LSA Licensee internal information which was not accessible outside of the LSA Licensee's network. Eventual error messages or update requests may need to be provided from the LC-OD back to the LC-NOD in order to possibly re-do the pre-processing operation.

In some embodiments, the LC-OD may be integrated into 3GPP LTE SA5 architecture into an NMLS component. In some embodiments, the LC-NOD may be left outside of an operator network and may interact with LSA/SAS Repository, LR and LC-OD. Alternatively, the LC may be left unchanged in the operator domain while the LSA/SAS LR may be split to include an LR-OD (operator component) and LR-NOD (non-operator component. In some embodiments, the LC may interact with the LR in order to obtain updated information upon which actions may be performed, typically leading to a reconfiguration of the Operator's network. In some cases, there may be no separation between LR-OD and LR-NOD, and some or all LSA related information (at least information provided by the Incumbent) may be buffered in a single location, such as the LR. In some cases, operators may not agree to have sensitive internal information stored in an outside entity which is not under the operator's control. In some embodiments described herein, the LR-NOD may store information that is not of sensitive value for the LSA Licensee (and may be restricted from information that is of sensitive value for the LSA Licensee in some cases). LSA Licensee sensitive information may need to be stored in the LR-OD. That is, when the Incumbent provides information to the LR, the LR-NOD may perform a pre-processing operation and may consider whether the information is sensitive to concerned LSA Licensee(s). When the information is considered NOT to be sensitive, it may be buffered in the LR-NOD. If it is identified to be sensitive, it may be forwarded to the LR-OD of the concerned LSA Licensee (Operator). Also, the LC may interact directly with the LR-OD. If the LC needs to access information stored in the LR-OD, the information may be directly provided since it may be present in the LR-OD. If the information is contained in the LR-NOD, the LR-OD may need to first request the information from the LR-NOD, then the LR-NOD may deliver the information to the LR-OD and then it can be provided to the LC. Alternatively, it is possible that the LR-NOD may be mirrored in the LR-OD such that the information may be directly accessible by the LC. Also, as another alternative, it is possible that the LC may interact directly with both the LR-OD and LR-NOD in order to have more direct access. In some embodiments, an LSA/SAS operator component (LC-OD and LR-OD) may be in communication with SA network elements (NE) through existing SA5 interfaces.

In Example 1, an apparatus of a base station configured to operate in a domain of a mobile network may comprise interface circuitry. The apparatus may further comprise hardware processing circuitry. The hardware processing circuitry may configure the interface circuitry to send, to a mobile network shared spectrum controller of the mobile network domain, a request to register with a shared spectrum repository for secondary usage of shared spectrum. The hardware processing circuitry may further configure the interface circuitry to receive, from the mobile network shared spectrum controller, a registration confirmation message that indicates whether at least a portion of the shared spectrum is available for the secondary usage by the base station. The shared spectrum repository may operate externally to the mobile network domain. The shared spectrum may be at least partly reserved, by the shared spectrum repository, for primary usage by one or more incumbent devices.

In Example 2, the subject matter of Example 1, wherein the registration confirmation message may be received from the mobile network shared spectrum controller on behalf of a public shared spectrum controller that is excluded from the mobile network domain.

In Example 3, the subject matter of one or any combination of Examples 1-2, wherein the apparatus may further include transceiver circuitry. The hardware processing circuitry may configure the transceiver circuitry to transmit, to a User Equipment (UE), a spectrum allocation message that allocates at least a portion of the shared spectrum for usage by the UE. The hardware processing circuitry may further configure the transceiver circuitry to transmit a data signal to the UE in the shared spectrum. The data signal may be transmitted in accordance with a spectrum sharing policy managed by the shared spectrum repository.

In Example 4, the subject matter of one or any combination of Examples 1-3, wherein the hardware processing circuitry may further configure the interface circuitry to receive, from the mobile network shared spectrum controller on behalf of the public shared spectrum controller, a request to determine a signal quality measurement. The hardware processing circuitry may be further configured to determine a signal quality measurement based on a signal received at the base station from a User Equipment (UE). The signal may be received in the shared spectrum. The hardware processing circuitry may further configure the interface circuitry to send the signal quality measurement to the mobile network shared spectrum controller. The hardware processing circuitry may include baseband circuitry to determine the signal quality measurement.

In Example 5, the subject matter of one or any combination of Examples 1-4, wherein the base station may be configured to operate as an Evolved Node-B (eNB) in accordance with a Third Generation Partnership Project (3GPP) protocol. The shared spectrum may include at least a licensed portion and an unlicensed portion that are combined in accordance with a 3GPP License Assisted Access (LAA) protocol.

In Example 6, the subject matter of one or any combination of Examples 1-5, wherein the base station may be configured to operate in accordance with a Third Generation Partnership Project (3GPP) protocol as an Evolved Node-B (eNB), macro cell eNB, femto cell eNB or small cell eNB.

In Example 7, the subject matter of one or any combination of Examples 1-6, wherein the base station may be configured to operate as an Evolved Node-B (eNB) as part of a Third Generation Partnership Project (3GPP) network. The hardware processing circuitry may be further configured to receive, from a network management (NM) element of the 3GPP network and on behalf of the public shared spectrum controller, spectrum access information and/or spectrum reclaiming information. The spectrum access information may indicate a time period and/or a geographic area in which the shared spectrum is to be used in the 3GPP network. The spectrum reclaiming information may indicate a time period and/or a geographic area in which the shared spectrum is not to be used in the 3GPP network.

In Example 8, an apparatus of a mobile network shared spectrum controller may be configured to operate in a domain of a mobile network. The apparatus may comprise interface circuitry. The apparatus may further comprise hardware processing circuitry. The hardware processing circuitry may configure the interface circuitry to receive, from an Evolved Node-B (eNB) of the mobile network domain, a request to register with a shared spectrum repository for secondary usage of shared spectrum. The hardware processing circuitry may further configure the interface circuitry to send, to a public shared spectrum controller external to the mobile network domain, a registration message that indicates that the eNB has requested to register with the shared spectrum repository. The registration message may be based at least partly on an identity of the eNB that is obfuscated to enable a confidentiality of mobile network configuration information within the mobile network domain.

In Example 9, the subject matter of Example 8, wherein the mobile network shared spectrum controller may be configured to operate with the public shared spectrum controller as part of a Licensed Shared Access (LSA) controller that manages the secondary usage of the shared spectrum. The shared spectrum repository may include an LSA repository.

In Example 10, the subject matter of one or any combination of Examples 8-9, wherein the mobile network shared spectrum controller may be configured to operate with the public shared spectrum controller as part of a Spectrum Access System (SAS) controller that manages the secondary usage of the shared spectrum.

In Example 11, the subject matter of one or any combination of Examples 8-10, wherein the hardware processing circuitry may be configured to determine the mobile network configuration information based at least partly on operation of the eNB in the mobile network. The hardware processing circuitry may further configure the interface circuitry to send, to the public shared spectrum controller, a public portion of the network configuration information. The hardware processing circuitry may be configured to restrict sending of a confidential portion of the network configuration information to the public shared spectrum controller.

In Example 12, the subject matter of one or any combination of Examples 8-11, wherein the restriction of the sending of the confidential portion of the network configuration information may be to enable an obfuscation of the confidential portion from the public shared spectrum controller.

In Example 13, the subject matter of one or any combination of Examples 8-12, wherein the restriction of the sending of the confidential portion of the network configuration information may be to enable an obfuscation of the confidential portion from components operating outside of the mobile network domain.

In Example 14, the subject matter of one or any combination of Examples 8-13, wherein the hardware processing circuitry may include baseband circuitry to determine the network configuration information.

In Example 15, the subject matter of one or any combination of Examples 8-14, wherein the hardware processing circuitry may further configure the interface circuitry to receive, from the public shared spectrum controller on behalf of the shared spectrum repository, a registration confirmation message for the request by the eNB to register with the shared spectrum repository. The registration confirmation message may be based at least partly on the obfuscated identity of the eNB.

In Example 16, the subject matter of one or any combination of Examples 8-15, wherein the hardware processing circuitry may further configure the interface circuitry to receive, from the public shared spectrum controller on behalf of the shared spectrum repository, a spectrum unavailability message that indicates an unavailability of the shared spectrum for the secondary usage. The hardware processing circuitry may further configure the interface circuitry to send, to the eNB, a spectrum vacate message that indicates that the eNB is to refrain from the secondary usage. The shared spectrum may be reserved, by the shared spectrum repository, for primary usage by one or more incumbent devices.

In Example 17, the subject matter of one or any combination of Examples 8-16, wherein the hardware processing circuitry may further configure the interface circuitry to send, to the public shared spectrum controller for forwarding to the shared spectrum repository, a spectrum usage message that indicates the secondary usage of the shared spectrum by the eNB. The spectrum usage message and the spectrum vacate message may be based at least partly on the obfuscated identity of the eNB.

In Example 18, the subject matter of one or any combination of Examples 8-17, wherein the unavailability of the shared spectrum may be based on a reclaiming, by the one or more incumbent devices, of the shared spectrum for the primary usage.

In Example 19, the subject matter of one or any combination of Examples 8-18, wherein the mobile network may include a Third Generation Partnership Project (3GPP) network. The mobile network shared spectrum controller may operate as part of a Network Management Layer Service (NMLS) of the 3GPP network.

In Example 20, the subject matter of one or any combination of Examples 8-19, wherein the hardware processing circuitry may further configure the interface circuitry to receive, from the public shared spectrum controller, spectrum access information that indicates a time period and/or a geographic area in which the shared spectrum is to be used in the mobile network. The hardware processing circuitry may further configure the interface circuitry to send the spectrum access information over a type-7 interface to a network management (NM) element of the 3GPP network for forwarding to the eNB.

In Example 21, the subject matter of one or any combination of Examples 8-20, wherein the hardware processing circuitry may further configure the interface circuitry to receive, from the public shared spectrum controller, spectrum reclaiming information that indicates a time period and/or a geographic area in which the shared spectrum is not to be used in the mobile network. The hardware processing circuitry may further configure the interface circuitry to send the spectrum reclaiming information over a type-7 interface to a network management (NM) element of the 3GPP network for forwarding to the eNB.

In Example 22, a non-transitory computer-readable storage medium may store instructions for execution by one or more processors to perform operations for management of shared spectrum by a mobile network shared spectrum controller of a domain of a mobile network. The operations may configure the one or more processors to determine mobile network configuration information based on secondary usage of shared spectrum by a group of one or more Evolved Node-Bs (eNBs) of the mobile network domain. The operations may further configure the one or more processors to configure the mobile network shared spectrum controller to send, to a public shared spectrum controller, a public portion of the mobile network configuration information. The operations may configure the one or more processors to configure the mobile network shared spectrum controller to refrain from sending of a confidential portion of the mobile network configuration information to the public shared spectrum controller.

In Example 23, the subject matter of Example 22, wherein the confidential portion of the mobile network configuration information may include signal quality measurements at one or more of the eNBs. The public portion of the mobile network configuration information may include a combined signal quality measurement based on the signal quality measurements at the eNBs.

In Example 24, the subject matter of one or any combination of Examples 22-23, wherein the public portion of the mobile network configuration information may be sent to the public shared spectrum controller for forwarding to a shared spectrum repository that reserves the shared spectrum for primary usage by one or more incumbent devices.

In Example 25, the subject matter of one or any combination of Examples 22-24, wherein the mobile network shared spectrum controller may be configured to operate with the public shared spectrum controller as part of a Licensed Shared Access (LSA) controller. The shared spectrum repository may include an LSA repository.

In Example 26, the subject matter of one or any combination of Examples 22-25, wherein the operations may further configure the one or more processors to configure the network internal shared spectrum controller to send, to the public shared spectrum controller for forwarding to the shared spectrum repository, a spectrum usage message that indicates the secondary usage of the shared spectrum by the group of eNBs. The spectrum usage message may be based at least partly on obfuscated identities of the group of eNBs.

In Example 27, an apparatus of a mobile network shared spectrum repository may be configured to operate in a domain of a mobile network. The apparatus may comprise interface circuitry. The apparatus may further comprise hardware processing circuitry. The hardware processing circuitry may configure the interface circuitry to receive, from a mobile network shared spectrum controller of the mobile network domain, a secondary usage message that indicates a secondary usage of shared spectrum by an Evolved Node-B (eNB) of the mobile network domain. The hardware processing circuitry may further configure the interface circuitry to send, to a public shared spectrum repository excluded from the mobile network domain, a secondary usage verification message that indicates the secondary usage of the shared spectrum and obfuscates an identity of the eNB. The hardware processing circuitry may further configure the interface circuitry to receive, from the public shared spectrum repository, an indicator of whether the secondary usage is in compliance with a shared spectrum policy.

In Example 28, the subject matter of Example 27, wherein the mobile network shared spectrum repository may be configured to operate with the public shared spectrum repository as part of a Licensed Shared Access (LSA) repository. The shared spectrum may be reserved, by the LSA repository, for primary usage by one or more incumbent devices.

In Example 29, the subject matter of one or any combination of Examples 27-28, wherein the identity of the eNB may be obfuscated in the secondary usage verification message to enable a confidentiality of mobile network configuration information within the mobile network domain.

In Example 30, the subject matter of one or any combination of Examples 27-29, wherein the hardware processing circuitry may further configure the interface circuitry to receive, from the shared spectrum controller, mobile network configuration information for the mobile network that is based at least partly on operation of the eNB in the mobile network. The hardware processing circuitry may further configure the interface circuitry to send, to the public shared spectrum repository, a public portion of the mobile network configuration information. The hardware processing circuitry may be configured to restrict sending of a confidential portion of the mobile network configuration information to the public shared spectrum repository.

In Example 31, the subject matter of one or any combination of Examples 27-30, wherein the restriction of the sending of the confidential portion of the mobile network configuration information may be to enable an obfuscation of the confidential portion from the public shared spectrum repository.

In Example 32, the subject matter of one or any combination of Examples 27-31, wherein the hardware processing circuitry may further configure the interface circuitry to receive, from the public shared spectrum repository, a spectrum unavailability message that indicates an unavailability of the shared spectrum for the secondary usage. The hardware processing circuitry may further configure the interface circuitry to send, to the mobile network shared spectrum controller, an indicator of the unavailability of the shared spectrum. The shared spectrum may be reserved for primary usage by one or more incumbent devices. The unavailability of the shared spectrum may be based on a reclaiming, by the one or more incumbent devices, of the shared spectrum for the primary usage.

In Example 33, the subject matter of one or any combination of Examples 27-32, wherein the mobile network may include a Third Generation Partnership Project (3GPP) network. The mobile network shared spectrum repository may operate as part of a Network Management Layer Service (NMLS) of the 3GPP network.

In Example 34, the subject matter of one or any combination of Examples 27-33, wherein the secondary usage message may be received, from the mobile network shared spectrum controller, over a Type-7 interface of the 3GPP network.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Evolved Node-B (eNB) configured to operate in a domain of a mobile network, the apparatus comprising:
   interface circuitry; and
   hardware processing circuitry, the hardware processing circuitry to configure the interface circuitry to:
      send, to a mobile network shared spectrum controller of the mobile network domain, a request to register with a shared spectrum repository for secondary usage of shared spectrum; and
      receive, from the mobile network shared spectrum controller, a registration confirmation message that indicates whether at least a portion of the shared spectrum is available for the secondary usage by the eNB,
   wherein the shared spectrum repository operates externally to the mobile network domain, wherein the shared spectrum is at least partly reserved, by the shared spectrum repository, for primary usage by one or more incumbent devices,
wherein the registration confirmation message is received from the mobile network shared spectrum controller on behalf of a public shared spectrum controller,
wherein the eNB is configured to operate as part of a cellular network, and
wherein the hardware processing circuitry is further configured to receive, from a network management (NM) element of the cellular network and on behalf of the public shared spectrum controller, spectrum access information that indicates a first time period and geographic area in which the shared spectrum is to be used in the cellular network and spectrum reclaiming information that indicates a second time period and geographic area in which the shared spectrum is not to be used in the cellular network.

2. The apparatus according to claim 1, wherein:
the apparatus further includes transceiver circuitry,
the hardware processing circuitry is to configure the transceiver circuitry to:
    transmit, to a User Equipment (UE), a spectrum allocation message that allocates at least a portion of the shared spectrum for usage by the UE; and
    transmit a data signal to the UE in the shared spectrum, the data signal transmitted in accordance with a spectrum sharing policy managed by the shared spectrum repository.

3. The apparatus according to claim 1, the hardware processing circuitry configured to:
configure the interface circuitry to receive, from the mobile network shared spectrum controller on behalf of the public shared spectrum controller, a request to determine a signal quality measurement;
determine a signal quality measurement based on a signal received at the eNB from a User Equipment (UE), the signal further received in the shared spectrum; and
configure the interface circuitry to send the signal quality measurement to the mobile network shared spectrum controller,
wherein the hardware processing circuitry includes baseband circuitry to determine the signal quality measurement.

4. The apparatus according to claim 1, wherein:
the eNB is configured to operate in accordance with a Third Generation Partnership Project (3GPP) protocol, and
the shared spectrum includes at least a licensed portion and an unlicensed portion that are combined in accordance with a 3GPP License Assisted Access (LAA) protocol.

5. The apparatus according to claim 1, wherein the eNB is configured to operate in accordance with a Third Generation Partnership Project (3GPP) protocol—as a macro cell eNB, femto cell eNB or small cell eNB.

6. The apparatus according to claim 1, wherein the public shared spectrum controller is excluded from the mobile network domain.

7. An apparatus of a mobile network shared spectrum controller configured to operate in a domain of a mobile network, the apparatus comprising:
interface circuitry; and
hardware processing circuitry, the hardware processing circuitry to configure the interface circuitry to:
    receive, from an Evolved Node-B (eNB) of the mobile network domain, a request to register with a shared spectrum repository for secondary usage of shared spectrum; and
    send, to a public shared spectrum controller external to the mobile network domain, a registration message that indicates that the eNB has requested to register with the shared spectrum repository,
wherein the registration message is based at least partly on an identity of the eNB that is obfuscated to enable a confidentiality of mobile network configuration information within the mobile network domain,
wherein the mobile network includes a cellular network and the mobile network shared spectrum controller operates as part of a Network Management Layer Service (NMLS) of the cellular network, and
the hardware processing circuitry to further configure the interface circuitry to:
    receive, from the public shared spectrum controller, spectrum access information that indicates a first time period and a geographic area in which the shared spectrum is to be used in the mobile network, and spectrum reclaiming information that indicates a time period and a geographic area in which the shared spectrum is not to be used in the mobile network, and
    send the spectrum access information and spectrum reclaiming information over a type-7 interface to a network management (NM) element of the cellular network for forwarding to the eNB.

8. The apparatus according to claim 7, wherein:
the mobile network shared spectrum controller is configured to operate with the public shared spectrum controller as part of a Licensed Shared Access (LSA) controller that manages the secondary usage of the shared spectrum, and
the shared spectrum repository includes an LSA repository.

9. The apparatus according to claim 7, wherein the mobile network shared spectrum controller is configured to operate with the public shared spectrum controller as part of a Spectrum Access System (SAS) controller that manages the secondary usage of the shared spectrum.

10. The apparatus according to claim 7, wherein the hardware processing circuitry is configured to:
determine the mobile network configuration information based at least partly on operation of the eNB in the mobile network;
configure the interface circuitry to send, to the public shared spectrum controller, a public portion of the network configuration information; and
restrict sending of a confidential portion of the network configuration information to the public shared spectrum controller.

11. The apparatus according to claim 10, wherein the restriction of the sending of the confidential portion of the network configuration information is to enable an obfuscation of the confidential portion from the public shared spectrum controller.

12. The apparatus according to claim 10, wherein the restriction of the sending of the confidential portion of the network configuration information is to enable an obfuscation of the confidential portion from components operating outside of the mobile network domain.

13. The apparatus according to claim 10, wherein the hardware processing circuitry includes baseband circuitry to determine the network configuration information.

14. The apparatus according to claim 7, the hardware processing circuitry to further configure the interface circuitry to:
  receive, from the public shared spectrum controller on behalf of the shared spectrum repository, a registration confirmation message for the request by the eNB to register with the shared spectrum repository,
  wherein the registration confirmation message is based at least partly on the obfuscated identity of the eNB.

15. The apparatus according to claim 7, the hardware processing circuitry to further configure the interface circuitry to:
  receive, from the public shared spectrum controller on behalf of the shared spectrum repository, a spectrum unavailability message that indicates an unavailability of the shared spectrum for the secondary usage; and
  send, to the eNB, a spectrum vacate message that indicates that the eNB is to refrain from the secondary usage,
  wherein the shared spectrum is reserved, by the shared spectrum repository, for primary usage by one or more incumbent devices.

16. The apparatus according to claim 15, the hardware processing circuitry to further configure the interface circuitry to:
  send, to the public shared spectrum controller for forwarding to the shared spectrum repository, a spectrum usage message that indicates the secondary usage of the shared spectrum by the eNB,
  wherein the spectrum usage message and the spectrum vacate message are based at least partly on the obfuscated identity of the eNB.

17. The apparatus according to claim 15, wherein the unavailability of the shared spectrum is based on a reclaiming, by the one or more incumbent devices, of the shared spectrum for the primary usage.

18. The apparatus according to claim 7, wherein:
  the cellular network is a Third Generation Partnership Project (3GPP) network.

19. A computer-readable storage medium that stores instructions for execution by one or more processors to perform operations for management of shared spectrum by a mobile network shared spectrum controller of a domain of a mobile network, the operations to configure the one or more processors to:
  determine mobile network configuration information based on secondary usage of shared spectrum by a group of one or more Evolved Node-Bs (eNBs) of the mobile network domain;
  configure the mobile network shared spectrum controller to send, to a public shared spectrum controller, a public portion of the mobile network configuration information;
  configure the mobile network shared spectrum controller to refrain from sending of a confidential portion of the mobile network configuration information to the public shared spectrum controller,
  wherein the mobile network includes a cellular network, the mobile network shared spectrum controller operates as part of a Network Management Layer Service (NMLS) of the cellular network, and
  the operations further configure the one or more processors to:
    receive, from the public shared spectrum controller, spectrum access information that indicates a first time period and a geographic area in which the shared spectrum is to be used in the mobile network, and spectrum reclaiming information that indicates a time period and a geographic area in which the shared spectrum is not to be used in the mobile network, and
    send the spectrum access information and spectrum reclaiming information over a type-7 interface to a network management (NM) element of the cellular network for forwarding to the group of one or more of the eNBs.

20. The computer-readable storage medium according to claim 19, wherein:
  the confidential portion of the mobile network configuration information includes signal quality measurements at one or more of the eNBs, and
  the public portion of the mobile network configuration information includes a combined signal quality measurement based on the signal quality measurements at the eNBs.

21. The computer-readable storage medium according to claim 19, wherein the public portion of the mobile network configuration information is sent to the public shared spectrum controller for forwarding to a shared spectrum repository that reserves the shared spectrum for primary usage by one or more incumbent devices.

22. The computer-readable storage medium according to claim 19, wherein:
  the mobile network shared spectrum controller is configured to operate with the public shared spectrum controller as part of a Licensed Shared Access (LSA) controller, and
  the shared spectrum repository includes an LSA repository.

23. The computer-readable storage medium according to claim 19, the operations to further configure the one or more processors to configure the network internal shared spectrum controller to:
  send, to the public shared spectrum controller for forwarding to the shared spectrum repository, a spectrum usage message that indicates the secondary usage of the shared spectrum by the group of eNBs,
  wherein the spectrum usage message is based at least partly on obfuscated identities of the group of eNBs.

* * * * *